US012488192B2

(12) United States Patent
Galitsky

(10) Patent No.: US 12,488,192 B2
(45) Date of Patent: *Dec. 2, 2025

(54) GENERATING RECOMMENDATIONS BY USING COMMUNICATIVE DISCOURSE TREES OF CONVERSATIONS

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 18/156,697

(22) Filed: Jan. 19, 2023

(65) Prior Publication Data

US 2023/0153540 A1  May 18, 2023

Related U.S. Application Data

(63) Continuation of application No. 17/021,835, filed on Sep. 15, 2020, now Pat. No. 11,599,731.

(Continued)

(51) Int. Cl.
*G06F 40/35* (2020.01)
*G06F 16/242* (2019.01)
(Continued)

(52) U.S. Cl.
CPC ............ *G06F 40/35* (2020.01); *G06F 16/242* (2019.01); *G06F 40/253* (2020.01);
(Continued)

(58) Field of Classification Search
CPC ...... G06F 40/35; G06F 16/242; G06F 40/253; G06F 40/295; G06N 5/04; G06N 20/00
See application file for complete search history.

(56) References Cited

U.S. PATENT DOCUMENTS 6,332,143 B1 * 12/2001 Chase ................... G06F 40/237
6,487,545 B1    11/2002 Wical
(Continued)

OTHER PUBLICATIONS

Explore Word Analogies, Sense2vec: Semantic Analysis of the Reddit Hivemind, Explosion AI (2019), Available Online at: https://explosion.ai/demos/sense2vec, 2019, 2 Pages.

(Continued)

*Primary Examiner* — Brian L Albertalli
(74) *Attorney, Agent, or Firm* — Kilpatrick Townsend & Stockton LLP

(57) ABSTRACT

Techniques are disclosed for improved autonomous agents that can provide a recommendation in a non-intrusive, conversational manner. In an aspect, a method determines a first sentiment score for a first utterance and a second sentiment score for a second utterance, each sentiment score indicating an emotion indicated by the respective utterance. The method further identifies that a difference between the first sentiment score and the second sentiment score is greater than a threshold. The method further extracts a noun phrase from the second utterance. The method identifies a text fragment that includes an entity that corresponds to the noun phrase. The method identifies that the text fragment addresses a claim of the second utterance. The method forms a third utterance that includes the a recommendation related to the second utterance and adds the third utterance to the sequence of utterances after the second utterance.

20 Claims, 27 Drawing Sheets

Related U.S. Application Data

(60) Provisional application No. 62/909,350, filed on Oct. 2, 2019.

(51) Int. Cl.
*G06F 40/253* (2020.01)
*G06F 40/295* (2020.01)
*G06N 5/04* (2023.01)
*G06N 20/00* (2019.01)

(52) U.S. Cl.
CPC ............. *G06F 40/295* (2020.01); *G06N 5/04* (2013.01); *G06N 20/00* (2019.01)

(56) References Cited

U.S. PATENT DOCUMENTS

| | | | |
|---|---|---|---|
| 6,961,692 B1* | 11/2005 | Polanyi | G06F 40/35 704/8 |
| 7,729,655 B2 | 6/2010 | Burstein et al. | |
| 8,452,225 B2 | 5/2013 | Burstein et al. | |
| 9,171,037 B2 | 10/2015 | Galitsky et al. | |
| 10,628,528 B2* | 4/2020 | He | G06F 40/40 |
| 2002/0040292 A1 | 4/2002 | Marcu | |
| 2004/0044519 A1 | 3/2004 | Polanyi et al. | |
| 2004/0186719 A1* | 9/2004 | Polanyi | G06F 40/284 704/E17.002 |
| 2005/0086592 A1* | 4/2005 | Polanyi | G06F 40/35 707/E17.094 |
| 2010/0233666 A1 | 9/2010 | Burstein et al. | |
| 2016/0063879 A1* | 3/2016 | Vanderwende | G06F 16/3329 434/322 |
| 2018/0316635 A1* | 11/2018 | Chiu | G06F 40/30 |
| 2018/0357221 A1 | 12/2018 | Galitsky | |
| 2019/0065610 A1* | 2/2019 | Singh | G06F 16/9535 |
| 2019/0272323 A1 | 9/2019 | Galitsky | |
| 2019/0370604 A1 | 12/2019 | Galitsky | |
| 2020/0159830 A1* | 5/2020 | Mutalikdesai | G06N 5/01 |
| 2020/0279075 A1* | 9/2020 | Avedissian | G06N 20/00 |
| 2020/0349455 A1* | 11/2020 | Wan | G06N 5/045 |
| 2020/0364409 A1* | 11/2020 | Perez | G06F 40/284 |
| 2021/0097240 A1* | 4/2021 | Singh | G06F 40/253 |
| 2021/0103703 A1 | 4/2021 | Galitsky | |

OTHER PUBLICATIONS

Seo That Will Still War, Frase HubSpot Assistant, Frase (2019), Available Online at: https://www.frase.io/?hubspot, 2019, 5 pages.
Task Oriented Dialogue Dataset Survey, AtmaHou, Available online at https://github.com/AtmaHou/Task-Oriented-Dialogue-Dataset-Survey, Accessed from Internet on Feb. 2, 2021, 18 pages.
The bAbI Project, Facebook Babi, Available Online at: https://research.fb.com/downloads/babi/, 2019, 6 pages.
Turku NLP Group, Available Online at: http://bionlp-www.utu.fi/wv_demo/, Accessed from Internet on Nov. 4, 2021, 2 pages.
Word to Vec JS Demo, Turbomaze, Available Online at: http://turbomaze.github.io/word2vecjson/, Accessed from Internet on Nov. 4, 2021, 1 page.
U.S. Appl. No. 17/021,835, Corrected Notice of Allowability mailed on Nov. 3, 2022, 26 pages.
U.S. Appl. No. 17/021,835, Notice of Allowance mailed on Nov. 1, 2022, 31 pages.
Anelli et al., Knowledge-Aware and Conversational Recommender Systems, Proceedings of the 12th ACM Conference on Recommender Systems, Sep. 2018, pp. 521-522.
Banarescu et al., Abstract Meaning Representation for Sembanking, Proceedings of the 7th Linguistic Annotation Workshop & Interoperability with Discourse, Aug. 8-9, 2013, pp. 178-186.
Bar-Haim et al., Stance Classification of Context-Dependent Claims, Proceedings of the 15th Conference of the European Chapter of the Association for Computational Linguistics: vol. 1, Apr. 3-7, 2017, pp. 251-261.
Bazinska, Explore Word Analogies, Available Online at: https://lamyiowce.github.io/word2viz/, Jan. 7, 2017, 2 pages.
Berkovsky et al., Influencing Individually: Fusing Personalization and Persuasion, ACM Transactions on Interactive Intelligent Systems, vol. 2, No. 2, Article 9, Jun. 2012, 8 pages.
Bernard et al., The Power of Well-Connected Arguments: Early Sensitivity to the Connective Because, Journal of Experimental Child Psychology, vol. 111, No. 1, Jan. 2012, pp. 128-135.
Bolshakov et al., Synonymous Paraphrasing Using WordNet and Internet, Department of Computer Science and Engineering, Chung-Ang University, Seoul, Jan. 1970, 12 pages.
Bridge, Towards Conversational Recommender Systems: A Dialogue Grammar Approach, Conference: 6th European Conference ov Case Based Reasoning, ECCBR 2002, Jan. 2002, pp. 9-22.
Budanitsky et al., Evaluating WordNet-Based Measures of Lexical Semantic Relatedness, Computational Linguistics, vol. 32, No. 1, Mar. 2006, pp. 13-47.
Budzianowski et al., MultiWOZ—A Large-Scale Multi-Domain Wizard-of-Oz Dataset for Task-Oriented Dialogue Modelling, Proceedings of the 2018 Conference on Empirical Methods in Natural Language Processing, Oct. 31-Nov. 4, 2018, pp. 5016-5026.
Cabrio et al., A Natural Language Bipolar Argumentation Approach to Support Users in Online Debate Interactions, Argument and Computation, vol. 4, No. 3, Nov. 26, 2013, pp. 209-230.
Chen et al., Critiquing-Based Recommenders: Survey and Emerging Trends, User Modeling and User-Adapted Interaction, vol. 22, Nos. 1-2, Apr. 2012, pp. 125-150.
Cheng et al., Joint Training for Pivot-Based Neural Machine Translation, Proceedings of the Twenty-Sixth International Joint Conference on Artificial Intelligence (IJCAI-17), Feb. 21, 2017, 7 pages.
Christakopoulou et al., Towards Conversational Recommender Systems, KDD '16: Proceedings of the 22nd ACM SIGKDD International Conference on Knowledge Discovery and Data Mining, Aug. 13-17, 2016, 10 pages.
Coulmance et al., Trans-Gram, Fast Cross-Lingual Word-Embeddings, Available Online at: https://arxiv.org/pdf/1601.02502.pdf, Jan. 11, 2016, 8 pages.
Dagan et al., Recognizing Textual Entailment: Rational, Evaluation and Approaches, Natural Language Engineering, vol. 15, No. 4, Oct. 2009, pp. i-xvii.
Dung, On the Acceptability of Arguments and Its Fundamental Role in Nonmonotonic Reasoning, Logic Programming and N-Person Games, Artificial Intelligence, vol. 77, No. 2, Sep. 1995, pp. 321-357.
Ellsworth et al., Mutaphrase: Paraphrasing with FrameNet, Proceedings of the Workshop on Textual Entailment and Paraphrasing, Available Online at: http://www.icsi.berkeley.edu/pubs/speech/acl07.pdf, Jun. 2007, pp. 143-150.
Faruqui et al., Improving Vector Space Word Representations Using Multilingual Correlation, Proceedings of the 14th Conference of the European Chapter of the Association for Computational Linguistics, Apr. 26-30, 2014, pp. 462-471.
Felfernig et al., Developing Constraint-Based Recommenders, Recommender Systems Handbook, 2010, pp. 187-215.
Galitsky et al., Building Dialogue Structure from Discourse Tree of a Question, Proceedings of the 2018 EMNLP Workshop SCAI: The 2nd International Workshop on Search-Oriented Conversational AI, Oct. 31, 2018, pp. 17-23.
Galitsky et al., Building Integrated Opinion Delivery Environment, Proceedings of the Twenty-Fourth International Florida Artificial Intelligence Research Society Conference, Jan. 2011, 6 pages.
Galitsky et al., Chatbot Components and Architectures, In Developing Enterprise Chatbots, Springer, 2019, pp. 13-47.
Galitsky et al., Chatbot with a Discourse Structure-Driven Dialogue Management, Proceedings of the Software Demonstrations of the 15th Conference of the European Chapter of the Association for Computational Linguistics, Apr. 3-7, 2017, pp. 87-90.
Galitsky et al., Detecting Logical Argumentation in Text via Communicative Discourse Tree, Journal of Experimental & Theoretical Artificial Intelligence, vol. 30, No. 5, May 2018, 29 pages.
Galitsky et al., Discourse-Based Approach to Involvement of Background Knowledge for Question Answering, Proceedings of the

(56) References Cited

OTHER PUBLICATIONS

International Conference on Recent Advances in Natural Language Processing, Sep. 2-4, 2019, pp. 373-381.

Galitsky, Discourse-Level Dialogue Management, In Developing Enterprise Chatbots: Learning Linguistic Structures, Springer Nature, Apr. 5, 2019, pp. 365-387.

Galitsky et al., Extending Tree Kernels Towards Paragraphs, International Journal of Computational Linguistics and Applications, vol. 5, No. 1, Jan.-Jun. 2014, pp. 105-116.

Galitsky et al., From Generalization of Syntactic Parse Trees to Conceptual Graphs, Proceedings of the 18th International Conference on Conceptual structures: From Information to Intelligence, Jul. 26, 2010, pp. 185-190.

Galitsky et al., Inferring the Semantic Properties of Sentences by Mining Syntactic Parse Trees, Data & Knowledge Engineering, vol. 81-82, Nov.-Dec. 2012, 44 pages.

Galitsky et al., Interrupt Me Politely: Recommending Products and Services by Joining Human Conversation, Proceedings of the Workshop on Natural Language Processing in E-Commerce, Dec. 12, 2020, 11 pages.

Galitsky, Matching Parse Thickets for Open Domain Question Answering, Data & Knowledge Engineering, vol. 107, Jan. 2017, pp. 24-50.

Galitsky, Natural Language Understanding with the Generality Feedback, Discrete Mathematics and Theoretical Computer Science Technical Report 99-32, Jun. 1999, pp. 1-21.

Galitsky et al., On a Chatbot Conducting Dialogue-in-Dialogue, Proceedings of the 20th Annual SIGdial Meeting on Discourse and Dialogue, Sep. 11-13, 2019, pp. 118-121.

Galitsky et al., On a Chatbot Conducting Virtual Dialogues, CIKM '19: Proceedings of the 28th ACM International Conference on Information and Knowledge Management, vol. 4, Nov. 3, 2019, 4 pages.

Galitsky et al., Parse Thicket Representations for Answering Multi-Sentence Search, International Conference on Conceptual Structures, vol. 7735, Jan. 2013, 13 pages.

Galitsky et al., Programming Spatial Algorithms in Natural Language, Natural Language Processing, Available Online at https://www.researchgate.net/publication/255598711_Programming_Spatial_Algorithms_in_Natural_Language, Jan. 2008, pp. 16-23.

Galitsky, Providing Personalized Recommendation for Attending Events Based on Individual Interest Profiles, Artificial Intelligence Research, vol. 5, No. 1, Apr. 2016, 37 pages.

Galitsky et al., Using Generalization of Syntactic Parse Trees for Taxonomy Capture on the Web, Conceptual Structures for Discovering Knowledge—19th International Conference on Conceptual Structures, Available Online at: https://rd.springer.com/chapter/10.1007/978-3-642-22688-5_8, Jul. 2011, pp. 104-117.

Garcia-Villalba et al., A Framework to Extract Arguments in Opinion Texts, International Journal of Cognitive Informatics and Natural Intelligence, vol. 6, No. 3, Jul.-Sep. 2012, pp. 62-87.

Glickman et al., Web Based Probabilistic Textual Entailment, Computer Science Department, Available Online at: https://citeseerx.ist.psu.edu/viewdoc/download?doi=10.1.1.125.6555&rep=rep1&type=pdf, Jan. 2005, 4 pages.

Greenberg, Conversational Experiences: Building Relationships One Conversation at a Time, Social CRM: The Conversation, Oct. 30, 2018, 10 pages.

Gronroos, The Relationship Marketing Process: Communication, Interaction, Dialogue, Value, Journal of Business & Industrial Marketing, vol. 19, No. 2, Mar. 2004, pp. 99-113.

Hoffman, Financial Report Ontology, Available Online at: http://www.xbrlsite.com/2015/fro/, 2015, 2 pages.

Ibeke et al., Extracting and Understanding Contrastive Opinion through Topic Relevant Sentences, Proceedings of the Eighth International Joint Conference on Natural Language Processing, vol. 2, Nov. 27-Dec. 1, 2017, pp. 395-400.

Jijkoun et al., Recognizing Textual Entailment Using Lexical Similarity, Available Online at: https://u.cs.biu.ac.il/~nlp/RTE1/Proceedings/jijkoun_and_de_rijke.pdf, Jan. 2005, 4 pages.

Kostelnik et al., Chatbots For Enterprises: Outlook, Acta Universitatis Agriculturae ET Silviculturae Mendelianae Brunensis, vol. 67, No. 6, 2019, pp. 1541-1550.

Kwiatkowski et al., Natural Questions: A Benchmark for Question Answering Research, Transactions of the Association of Computational Linguistics, 2019, 14 pages.

Li et al., DailyDialog: A Manually Labelled Multi-Turn Dialogue Dataset, Proceedings of the Eighth International Joint Conference on Natural Language Processing, Long Papers, vol. 1, Dec. 1, 2017, pp. 986-995.

Lippi et al., Argument Mining from Speech: Detecting Claims in Political Debates, AAAI'16: Proceedings of the Thirtieth AAAI Conference on Artificial Intelligence, Feb. 2016, pp. 2979-2985.

Logacheva et al., ConvAI Dataset of Topic-Oriented Human-to-Chatbot Dialogues, The NIPS '17 Competition: Building Intelligent Systems, 2018, pp. 47-57.

Makhalova et al., Information Retrieval Chatbots Based on Conceptual Models, In Book: Graph-Based Representation and Reasoning, Jun. 2019, pp. 230-238.

Makhalova et al., Pattern Structures for News Clustering, Proceedings of the 4th International Conference on What can FCA do for Artificial Intelligence, vol. 1430, Jul. 2015, pp. 35-42.

Miceli et al., Emotional and Non-Emotional Persuasion, Applied Artificial Intelligence, Jun. 2006, pp. 1-25.

Mikolov et al., Efficient Estimation of Word Representations in Vector Space, Available Online at: https://arxiv.org/pdf/1301.3781.pdf, Sep. 7, 2013, pp. 1-12.

Mochales et al., Argumentation Mining, Artificial Intelligence and Law, vol. 19, No. 1, Apr. 11, 2011, pp. 1-22.

Murphy et al., What Makes a Text Persuasive? Comparing Students' and Experts' Conceptions of Persuasiveness, International Journal of Educational Research, vol. 35, pp. 675-698, 2001.

Narducci et al., Improving the User Experience with a Conversational Recommender System, International Conference of the Italian Association for Artificial Intelligence, Nov. 2018, pp. 528-538.

Pennington et al., GloVe: Global Vectors for Word Representation, Proceedings of the 2014 Conference on Empirical Methods in Natural Language Processing, Oct. 25-29, 2014, pp. 1532-1543.

Peters et al., Deep Contextualized Word Representations, Proceedings of the 2018 Conference of the North American Chapter of the Association for Computational Linguistics: Human Language Technologies, vol. 1, Jun. 1-6, 2018, pp. 2227-2237.

Rajpurkar et al., Know What You Don't Know: Unanswerable Questions for SQuAD, Available Online at: https://arxiv.org/pdf/1806.03822.pdf, Jun. 11, 2018, 9 pages.

Ritter et al., Data-Driven Response Generation in Social Media, Proceedings of the 2011 Conference on Empirical Methods in Natural Language Processing, Jul. 27-31, 2011, pp. 583-593.

Ruder, An Overview of Gradient Descent Optimization Algorithms, Available Online at: https://arxiv.org/pdf/1609.04747.pdf, Jun. 15, 2017, 14 pages.

Schlosser, Can Including Pros and Cons Increase the Helpfulness and Persuasiveness of Online Reviews? The Interactive Effects of Ratings and Arguments, Journal of Consumer Psychology, vol. 21, No. 3, Jul. 2011, pp. 226-239.

Schnabel et al., Evaluation Methods for Unsupervised Word Embeddings, Proceedings of the 2015 Conference on Empirical Methods in Natural Language Processing, Available Online at: https://www.aclweb.org/anthology/D15-1036.pdf, Sep. 17-21, 2015, pp. 298-307.

Schulz et al., A Frame Tracking Model for Memory-Enhanced Dialogue Systems, Available Online at: https://arxiv.org/pdf/1706.01690.pdf, Jun. 6, 2017, 9 pages.

Selivanov, GloVe Word Embeddings, Available Online at: https://cran.rproject.org/web/packages/text2vec/vignettes/glove.html, Feb. 18, 2020, 4 pages.

Sidorov et al., Syntactic N-Grams as Machine Learning Features for Natural Language Processing, Expert Systems with Applications, vol. 41, No. 3, Feb. 15, 2014, pp. 853-860.

Sun et al., Conversational Recommender System, The 41st International ACM SIGIR Conference on Research & Development in Information Retrieval, Available Online at: https://arxiv.org/pdf/1806.03277.pdf, Jul. 8-12, 2018, 10 pages.

(56) References Cited

OTHER PUBLICATIONS

Thompson et al., A Personalized System for Conversational Recommendations, Journal of Artificial Intelligence Research, vol. 21, No. 1, Mar. 2004, pp. 393-428.

Tseng et al., Tree-Structured Semantic Encoder with Knowledge Sharing for Domain Adaptation in Natural Language Generation, Available Online at: https://arxiv.org/pdf/1910.06719.pdf, Oct. 2, 2019, 10 pages.

Zhao et al., Application-Driven Statistical Paraphrase Generation, Proceedings of the 47th Annual Meeting of the ACL and the 4th IJCNLP of the AFNLP, Aug. 2-7, 2009, pp. 834-842.

\* cited by examiner

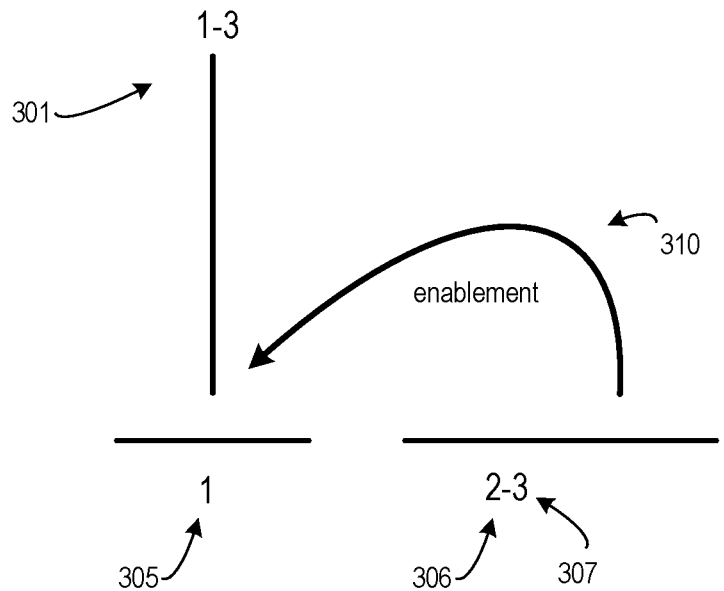
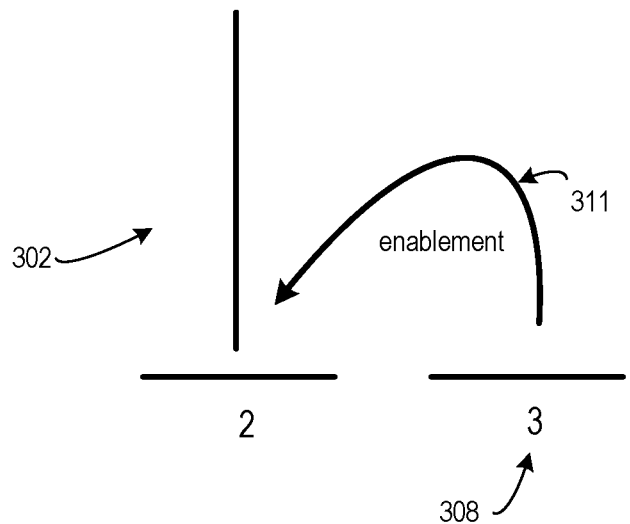
FIG. 3

| | |
|---|---|
| Agent: It's a good day today at Wealth Bank, my name is Joe, How can I help? | ← 1701 |
| Customer: tell me the remaining money in my account | ← 1702 |
| Agent: I will help you with this. Can I get your account # and name on this account? | ← 1703 |
| Customer: Sure, my name is Becky Randall, account # is 12233456 | ← 1704 |
| Agent: your balance is $123.78 | ← 1705 |
| Customer: if I transfer it to my bank account in Lloyds bank in London UK, how long would it take? | ← 1706 |
| Agent: If we do the transaction over the phone or online, our team members would contact you for verification before sending your money to an international bank. The process takes 2-3 days | ← 1707 |
| Agent2: Open Account in Morgan Chase and use Zelle QuickPay to quickly transfer money to your friends and partners abroad | ← 1708 |

| | |
|---|---|
| User: Where do you think I should eat tonight? | 1801 |
| Expert: What type of food would you like? | 1802 |
| User: What types are there? | 1803 |
| Expert: You can say things like Chinese, Indian, and Mediterranean. | 1804 |
| User: Oh, maybe a cheap Indian place. | 1805 |
| Expert: What kind of parking would you like? | 1806 |
| User: I don't care, as long as it's in Palo Alto. | 1807 |
| Expert: I'm sorry, I don't know of any restaurants like that, would you like to search for any price? | 1808 |
| User: No, I think I'd like Chinese instead. | 1809 |
| Expert: How does Mandarin Gourmet on 420 Ramona sound?1 | 1810 |
| User: No, what else do you have? | 1811 |
| Expert: How about Jing-Jing Szechwan Hunan Gourmet on 443 Emerson Street? | 1812 |
| User: I am /not sure it got high user rating | 1813 |
| Agent: Consider Golden Dragon Hunan on University ave. It has a great rating for food | 1814 |

*FIG. 18*

User: Car was shaking terrible, took to mechanic five times. Each time he would replace one spark plug at a time. It would run fine for a week, then again shaking and unable to gain speed ← 1901

Expert: I would start by doing a compression test which will confirm the timing chain or if have low compression in one or more cylinder. A timing chain cannot come and go like you have described. A spark plug fouling is telling us something else. ← 1902

Agent:
Spark Plug Fouling Diagnostics - Underhood Service
https://www.underhoodservice.com › spark-plug-fouling-diagnostics
Mar 19, 1918 - Spark plugs are the "canary in the coal mine" of the combustion chamber. The electrodes and porcelain can show short- and long-term .... ← 1903

*FIG. 19*

| | |
|---|---|
| Customer: there is a problem with feature *F* of product *P* | ← 2401 |
| CSA: It can (or cannot be fixed) by doing [this and that] with *F* of *P* | ← 2402 |
| Customer: No you still cannot fix problem of *P* .... | ← 2403 |
| **Agent: the product *R* will fix this problem with *F* of *P* since *R*'s feature *RF* covers *F*** | ← 2404 |

GENERATING RECOMMENDATIONS BY USING COMMUNICATIVE DISCOURSE TREES OF CONVERSATIONS

CROSS-REFERENCES TO RELATED APPLICATIONS

This application is a continuation of U.S. patent application Ser. No. 17/021,835, filed Sep. 15, 2020, now issued, which claims the benefit of U.S. Provisional Application No. 62/909,350 filed Oct. 2, 2019, the contents of both of which are incorporated herein for all purposes.

TECHNICAL FIELD

This disclosure is generally concerned with linguistics. More specifically, this disclosure relates to improved autonomous agents that use communicative discourse trees and other discourse techniques to provide a recommendation and identify an appropriate place at which to insert the recommendations into a conversation.

BACKGROUND

Computer-implemented applications of linguistics are increasing due to the greatly increased speed of processors and capacity of memory. For example, computer-based analysis of language discourse facilitates numerous applications, such as automated agents that can answer questions received from user devices.

But such solutions are unable to fully analyze utterances in a conversation between a user device and an autonomous agent. Consequently, these systems are unable to develop appropriate recommendations. Moreover, these systems are often overly intrusive from a user perspective.

BRIEF SUMMARY

Disclosed techniques relate to dialogue management between a user device and a computing device, including generating and providing recommendations. In an example, an autonomous agent analyzes utterances from a user device to determine a sentiment of the utterances. The autonomous agent detects that the sentiment has changed, develops an appropriate recommendation to addresses concerns raised by the user, and inserts the recommendation into the conversation.

In an aspect, a method of dialogue management accesses, from a conversation between a user device and a computing device, a sequence of utterances including a first utterance followed by a second utterance. The method further includes determining a first sentiment score for the first utterance and a second sentiment score for the second utterance. Each sentiment score indicates an emotion indicated by the respective utterance. The method further includes identifying that a difference between the first sentiment score and the second sentiment score is greater than a threshold. The method further includes extracting a noun phrase from the second utterance. The method further includes identifying, in an entity database, a text fragment that includes an entity that corresponds to the noun phrase. The method further includes verifying that the text fragment addresses a claim of the second utterance. The method further includes forming a third utterance that includes the text fragment. The method further includes adding the third utterance to the sequence of utterances after the second utterance. The method further includes and outputting the third utterance to the user device.

In an aspect, determining the sentiment score for each utterance includes identifying keywords from the utterance, determining a keyword sentiment score for each keyword of the keywords, where sentiment score indicates whether the keyword signifies positive or negative sentiment, and determining an average keyword sentiment score of the keywords.

In an aspect, determining the sentiment score for each utterance creating a communicative discourse tree from text including the utterance, providing the communicative discourse tree to a machine-learning model, the machine-learning model being trained to identify emotions based on input communicative discourse trees for which emotion associations are known, receiving the sentiment score from the machine-learning model.

In an aspect, verifying that the text fragment addresses a claim of the second utterance includes generating a first communicative discourse tree from the text fragment and a second communicative discourse tree from the second utterance. The verifying further includes translating the first communicative discourse tree into a first reason-conclusion logical formula and the second communicative discourse tree into a second reason-conclusion logical formula. The verifying further includes identifying that the first reason-conclusion logical formula supports the second reason-conclusion logical formula. The verification confirms that the recommendation logically confirms that the recommended product features will the solve customer problem.

In an aspect, generating a communicative discourse tree includes generating a discourse tree that represents rhetorical relationships between elementary discourse units and includes a node, each nonterminal node representing a rhetorical relationship between two of the elementary discourse units, each terminal node of the nodes of the discourse tree is associated with one of the elementary discourse units. Generating a communicative discourse tree further includes matching each elementary discourse unit that has a verb to a verb signature. The matching includes accessing a verb signature. The each verb signature includes the verb of the elementary discourse units and a sequence of thematic roles. The thematic roles describe a relationship between the verb and related words. The matching includes determining, for each verb signature of the verb signatures, a thematic role of the respective signature that match a role of a word in the elementary discourse unit. The matching includes selecting a particular verb signature from the verb signatures based on the particular verb signature, including a highest number of matches. The matching includes associating the particular verb signature with the elementary discourse unit.

In an aspect, the translating includes identifying, from an elementary discourse unit in the respective communicative discourse tree, logical atoms that correspond to text of the elementary discourse unit. The translating further includes identifying, from the respective communicative discourse tree, a rhetorical relation that (i) corresponds to a nucleus elementary discourse unit and a satellite elementary discourse unit and (ii) is included in a subset of rhetorical relations in the respective communicative discourse tree. The translating further includes constructing, from the rhetorical relation, a reason-conclusion logical formula by mapping the nucleus elementary discourse unit to a reason and the satellite elementary discourse unit to a conclusion. The translating further includes substituting logical atoms associated with the nucleus elementary discourse unit to the reason. The translating further includes substituting logical atoms associated with the satellite elementary discourse unit to the conclusion.

In an aspect, the method further includes constructing the entity database. Constructing the entity database includes determining, from a training text corpus, an entity corresponding to the noun phrase. The entity includes attributes. Constructing the entity database further includes forming a search query including the entity and the attributes. Constructing the entity database further includes submitting the search query to a search engine. Constructing the entity database further includes obtaining a result from the search engine. Constructing the entity database further includes adding the result into the entity database.

The exemplary methods discussed above can be implemented on systems including one or more processors or stored as instructions on a non-transitory computer-readable medium.

BRIEF DESCRIPTION OF THE DRAWINGS

FIG. 3 depicts a further example of a discourse tree in accordance with an aspect.

FIG. 17 illustrates an example of an improved approach to entering a conversation, in accordance with an aspect.

FIG. 18 illustrates an example of a dialogue with a successful recommendation, in accordance with an aspect.

FIG. 19 illustrates an example of an improved approach to entering a conversation, in accordance with an aspect.

FIG. 24 illustrates a connection between the utterances to resolve a problem concerning a seed product and a recommendation.

DETAILED DESCRIPTION

Figure 1:
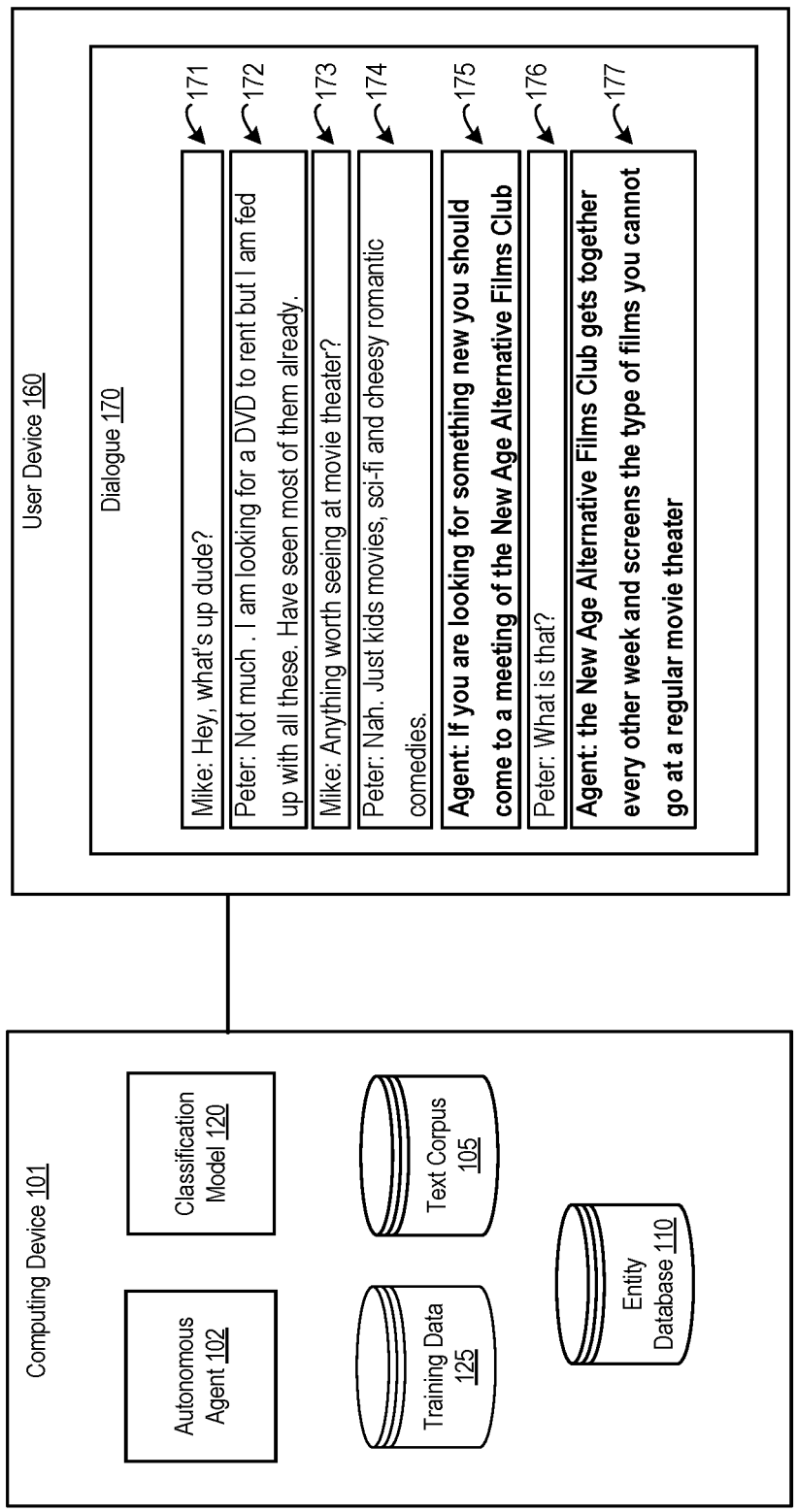
FIG. 1 shows an exemplary rhetoric classification environment, in accordance with an aspect.

Disclosed solutions provide technical improvements to the area of computer-implemented linguistics. In particular, disclosed solutions provide improved autonomous agents ("chatbots") that can analyze textual information present in utterances of a dialogue (e.g., between a user device and an autonomous agent) to determine a changing sentiment in the dialogue. Based on the change in sentiment, disclosed solutions generate an appropriate recommendation, and insert the recommendation at an appropriate position the dialogue.

A goal of recommendation systems is to help obtain items of interest. To do so, recommendation systems determine interests of a user and present items that satisfy those interests. But in contrast to disclosed solutions, existing systems attempt to determine user interests by using various different techniques, such as explicitly asking questions or guiding a user through a sequence of iterations, suggesting specific items, and using feedback from users to refine suggestions in subsequent iterations. Such approaches are not only intrusive, but are also only functional in a limited set of domains and often cannot consistently provide relevant and timely recommendations. For instance, these approaches fail to take into consideration the huge amount of knowledge, both structured and non-structured, found in user utterances during a dialogue.

In contrast, using preference and intent information explicitly provided by a user, certain aspects use techniques such as rhetorical structure theory and communicative discourse trees ("CDTs") to provide improved recommendations. In particular, certain aspects determine emotions expressed in text and an intent of a user and to match the intent with a recommendation. CDTs are discourse trees that are supplemented with one or more communicative actions. A communicative action is a cooperative action undertaken by individuals based on mutual deliberation and argumentation. Using communicative discourse trees and other techniques, improved performance over traditional statistical-based approaches can be accomplished, such as improved sentiment detection and logical analysis of sentences. Further, once a recommendation is constructed, certain aspects join a conversation when a recommendation is appropriate, thereby maximizing an effectiveness of the recommendation.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

Turning now to the Figures, FIG. 1 depicts an exemplary autonomous agent environment in accordance with an aspect of the present disclosure. Autonomous agent environment 100 includes computing device 101 and user device 160. In the example depicted in FIG. 1, computing device 101 implements an autonomous agent that engages in a conversation with user device 160. Dialogue 170, as presented on a screen of user device 160, includes multiple utterances.

Computing device 101 includes one or more of autonomous agent 102, text corpus 105, classification model 120, and training data 125. Examples of computing device 101 are distributed system 1900 and client computing devices 2502, 2504, 2506, and 2508. Using techniques such as discourse analysis, communicative discourse trees, and machine learning, the autonomous agent can monitor a sentiment of the utterances in dialogue 170 and determine a change in sentiment. Based on a change, the autonomous agent can determine a recommendation (e.g., for a product or service) and insert the recommendation into the dialogue.

Autonomous agent 102 can interact with user device 160, for example, in a dialogue session. An example of a method for facilitating such a dialogue is discussed with respect to FIG. 20. Autonomous agent 102 can monitor a sentiment of the conversation of dialogue 170 and determine a change in sentiment. Dialogue 170 includes utterances 171-177. As can be seen, a sentiment profile of message 174 differs from a sentiment profile of 172. Whereas the sentiment profile of message 172 is more optimistic, the sentiment profile of message 174 is more negative. Autonomous agent 102 can determine this sentiment profile change, for example by using communicative discourse trees, and can then determine a recommendation and insert the recommendation into the dialogue. Such a recommendation is shown in message 175. In message 176, the user asks for a clarification, which the agent provides in message 177. This dialogue can continue with additional recommendations if appropriate.

In some cases, autonomous agent 102 can use machine learning techniques. For example, classification model 120 can be trained to detect a presence of particular features within one or more utterances or within a communicative discourse tree generated from the utterances. Examples of classification models include machine-learning models such as support vector machines, nearest neighbor models, and tree kernel models.

In an example, classification model 120 can use one or more such models to analyze a communicative discourse tree generated from input text 110. Examples of features that can be detected in text via the use of communicative discourse trees include a presence of argumentation, rhetoric agreement, a consecutive answer, or another specific feature present in input text 110. Classification model 119 can be trained using and/or training data 125, which can be generated by autonomous agent 102 or another application or device.

In an aspect, autonomous agent 102 can also generate a text corpus 105 or training data 125 from input text. Examples of input text include electronic text source such as text files, Portable Document Format (PDF)® documents, rich text documents, and the like. In some cases, preprocessing may be performed on the input text to remove unwanted characters or formatting fields. Input text can be organized by using one or more structural or organizational approaches such as sections, paragraphs, pages, and the like.

User device 160 can be any mobile device such as a mobile phone, smart phone, tablet, laptop, smart watch, and the like. Examples of user device 160 include client computing devices 2502, 2504, 2506, and 2508.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate | The other alternate |
| Joint | (unconstrained) | (unconstrained) |
| List | An item | A next item |
| Sequence | An item | A next item |

Figure 2:
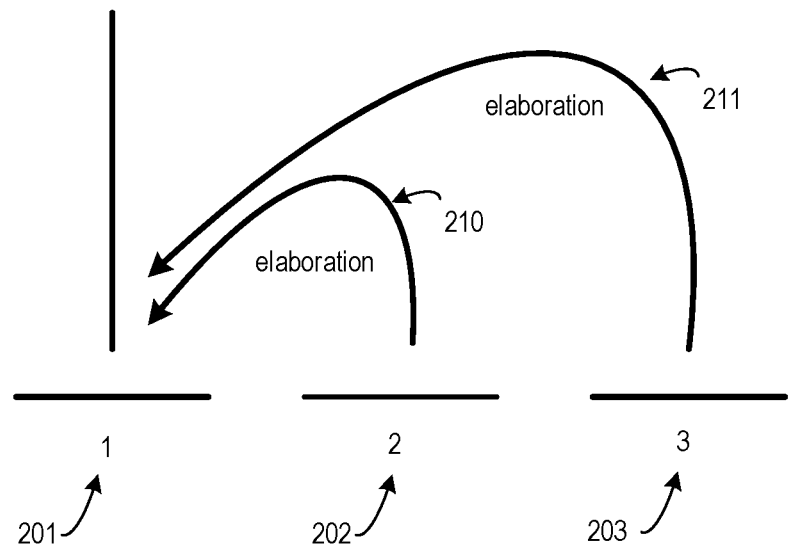
FIG. 2 depicts an example of a discourse tree in accordance with an aspect.

FIG. 2 depicts an example of a discourse tree, in accordance with an aspect. FIG. 2 includes discourse tree 190. Discourse tree includes text span 191, text span 192, text span 193, relation 210 and relation 228. The numbers in FIG. 2 correspond to the three text spans. FIG. 3 corresponds to the following example text with three text spans numbered 1, 2, 3:

1. Honolulu, Hawaii will be site of the 1917 Conference on Hawaiian History
2. It is expected that 190 historians from the U.S. and Asia will attend
3. The conference will be concerned with how the Polynesians sailed to Hawaii For example, relation 210, or elaboration, describes the relationship between text span 191 and text span 192. Relation 228 depicts the relationship, elaboration, between text span 193 and 194. As depicted, text spans 192 and 193 elaborate further on text span 191. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship 310, enablement, between components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
   (a) Unit size may vary, depending on the goals of the analysis
   (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
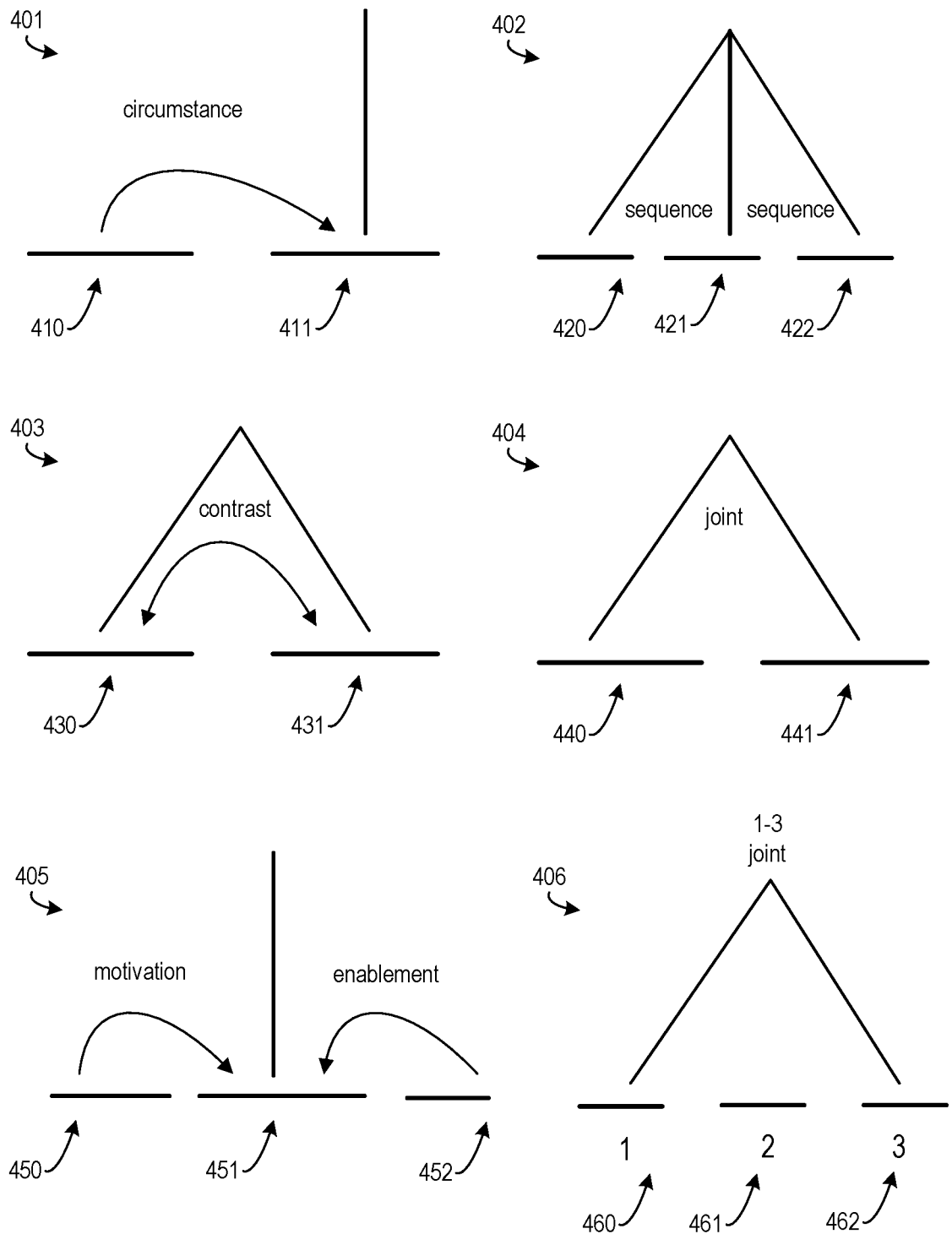
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 419 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
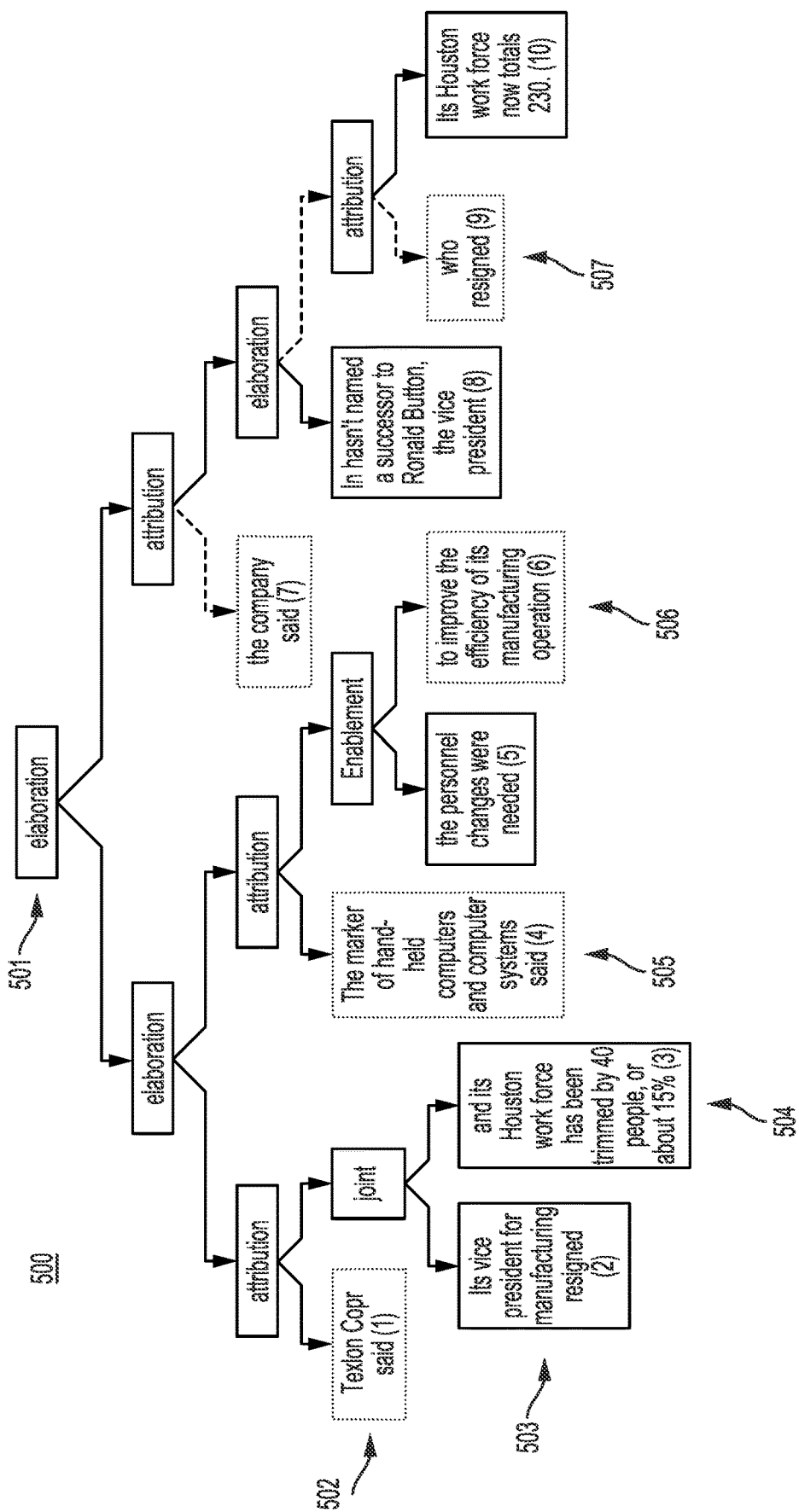
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 1913. Combining intra- and multi-sentential rhetorical parsing for document-level discourse analysis. In ACL (1), pages 486-496.

Figure 6:
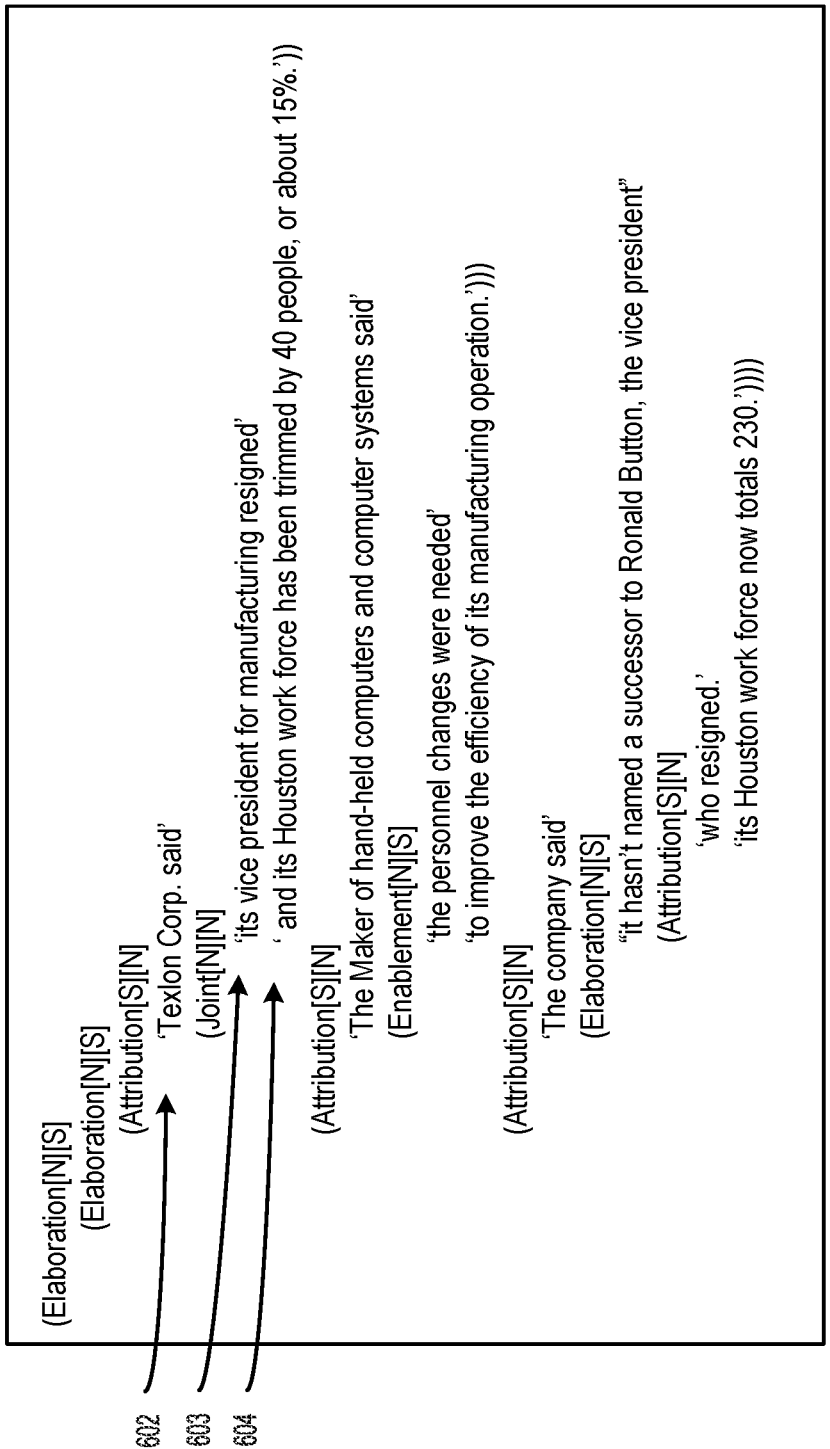
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (1915).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (1900). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 19 of which were relevant while failing to return 40 additional relevant pages, its precision is 19/30=2/3 while its recall is 19/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and The Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
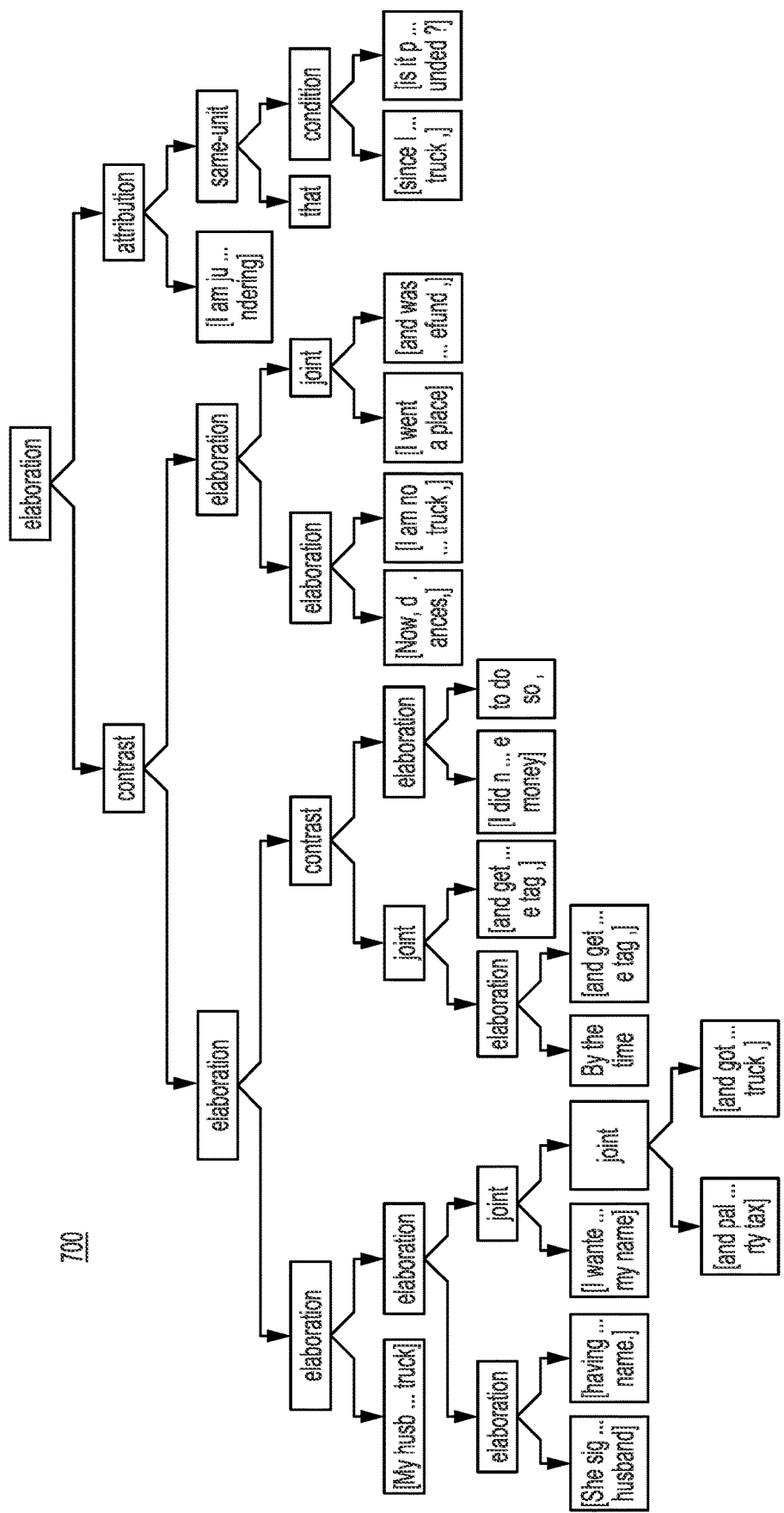
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
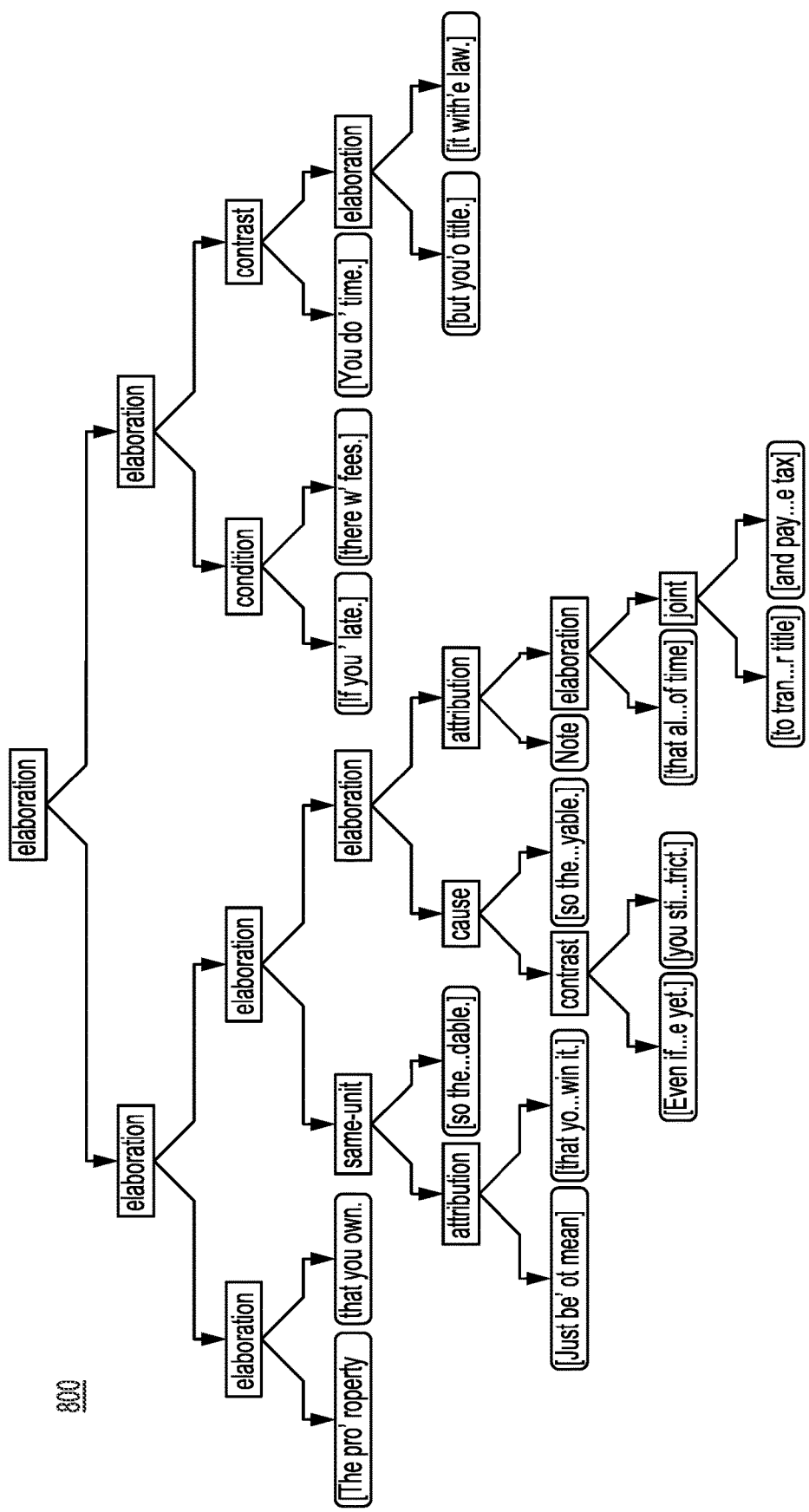
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
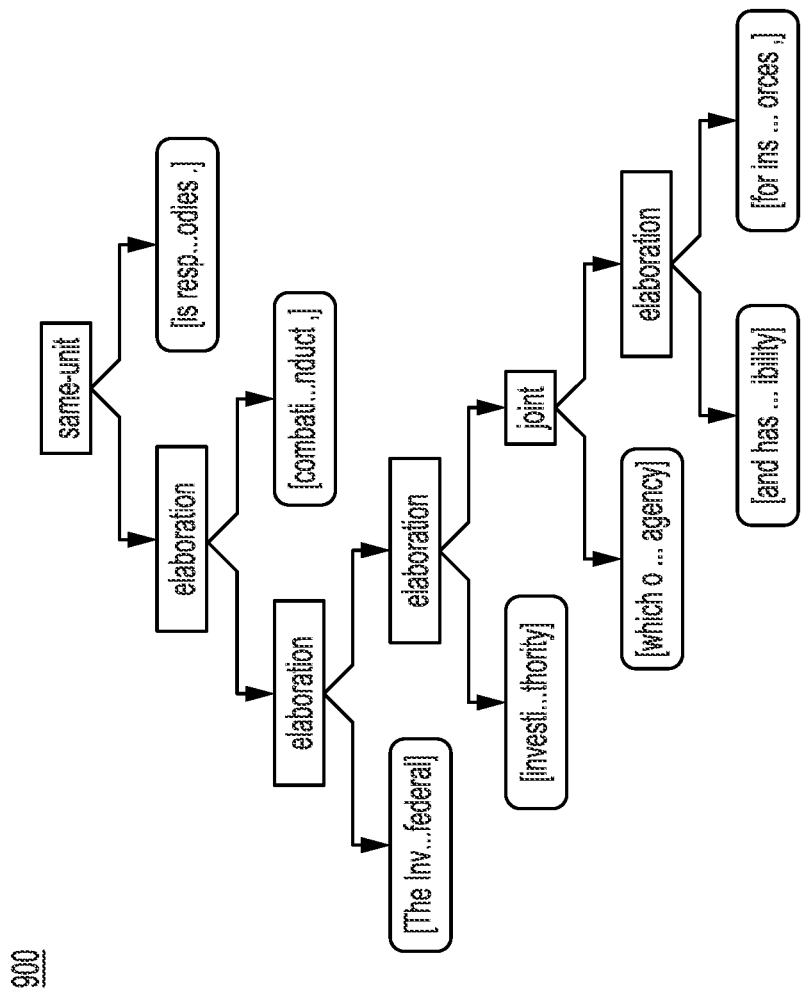
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
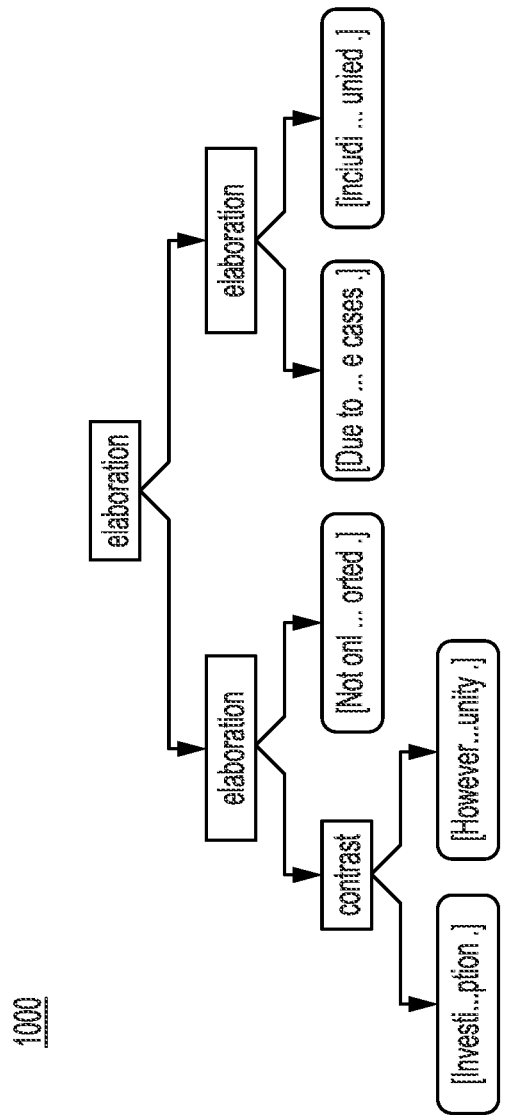
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Rhetoric classification autonomous agent 102 can determine whether a given answer or response, such as an answer obtained from answer database 105 or a public database, is responsive to a given question, or request. More specifically, rhetoric classification autonomous agent 102 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Rhetoric classification autonomous agent 102 can determine similarity between question-answer pairs using different methods. For example, rhetoric classification autonomous agent 102 can determine level of similarity between an individual question and an individual answer. Alternatively, rhetoric classification autonomous agent 102 can determine a measure of similarity between a first pair including a question and an answer, and a second pair including a question and answer.

For example, rhetoric classification autonomous agent 102 uses rhetoric agreement classifier 119 trained to predict matching or non-matching answers. Rhetoric classification autonomous agent 102 can process two pairs at a time, for example <q1, a1> and <q2, a2>. Rhetoric classification autonomous agent 102 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, rhetoric classification autonomous agent 102 uses training data 125 to train rhetoric agreement classifier 119. In this manner, rhetoric agreement classifier 119 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, rhetoric classification autonomous agent 102 provides a training pair to rhetoric agreement classifier 119 and receives, from the model, a level of complementarity. Rhetoric classification autonomous agent 102 calculates a loss function by determining a difference between the determined level of complementarity and an expected level of complementarity for the particular training pair. Based on the loss function, rhetoric classification autonomous agent 102 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Rhetoric classification autonomous agent 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov S O. Rhetoric Map of an Answer to Compound Queries Knowledge Trail Inc. ACL 1915, 681-686. ("Galitsky 1915"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
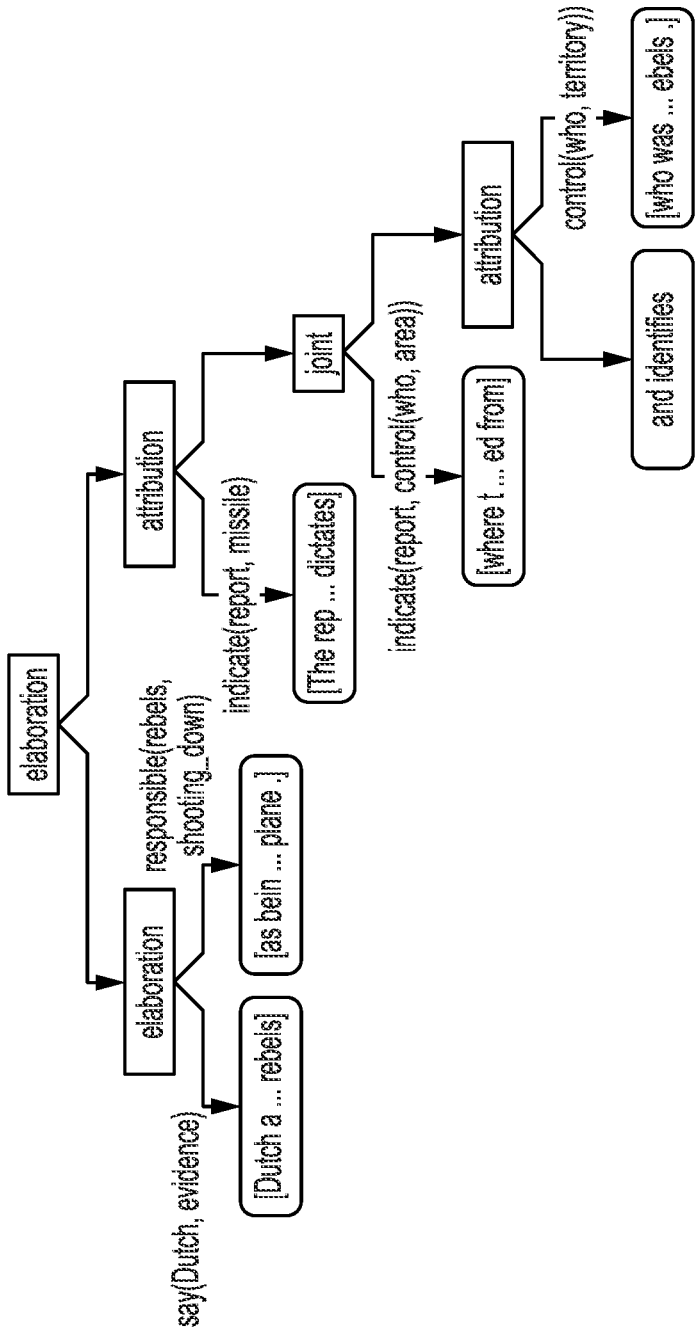
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MI-117 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

Figure 12:
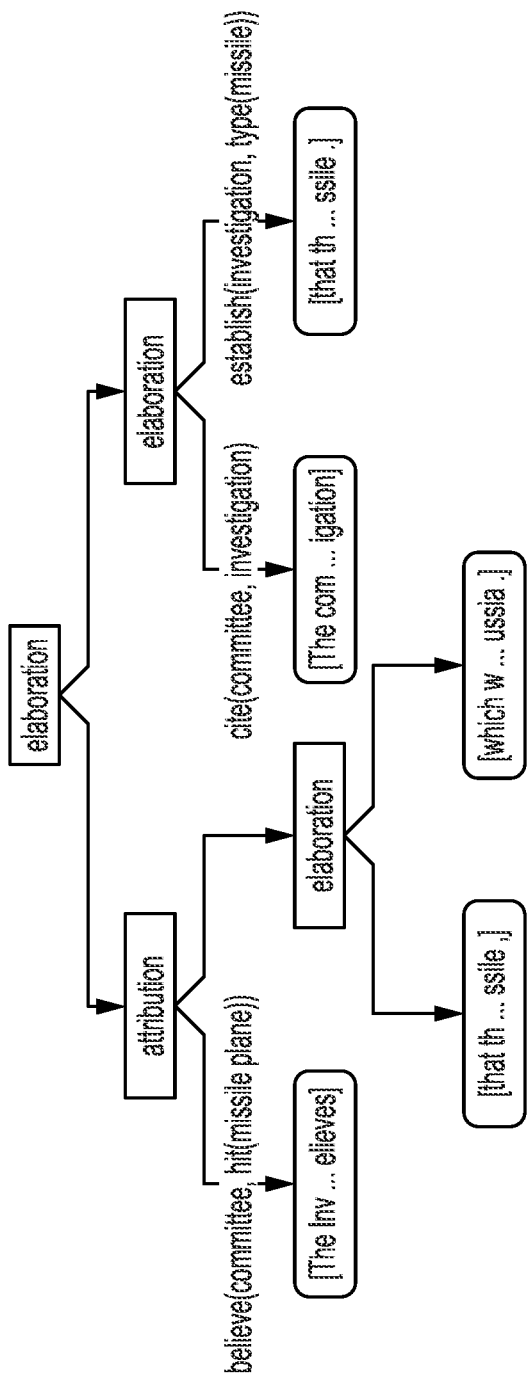
FIG. 12 illustrates a communicative discourse tree for a claim of a second agent in accordance with an aspect.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 1908. and/or Karin Kipper Schuler, Anna Korhonen, Susan W. Brown, VerbNet overview, extensions, mappings and apps, Tutorial, NAACL-HLT 1909, Boulder, Colorado FIG. 12 illustrates a communicative discourse tree for a claim of a second agent in accordance with an aspect. FIG. 12 depicts communicative discourse tree 1190, which represents the following text: "The Investigative Committee of the Russian Federation believes that the plane was hit by a missile, which was not produced in Russia. The committee cites an investigation that established the type of the missile."

Figure 13:
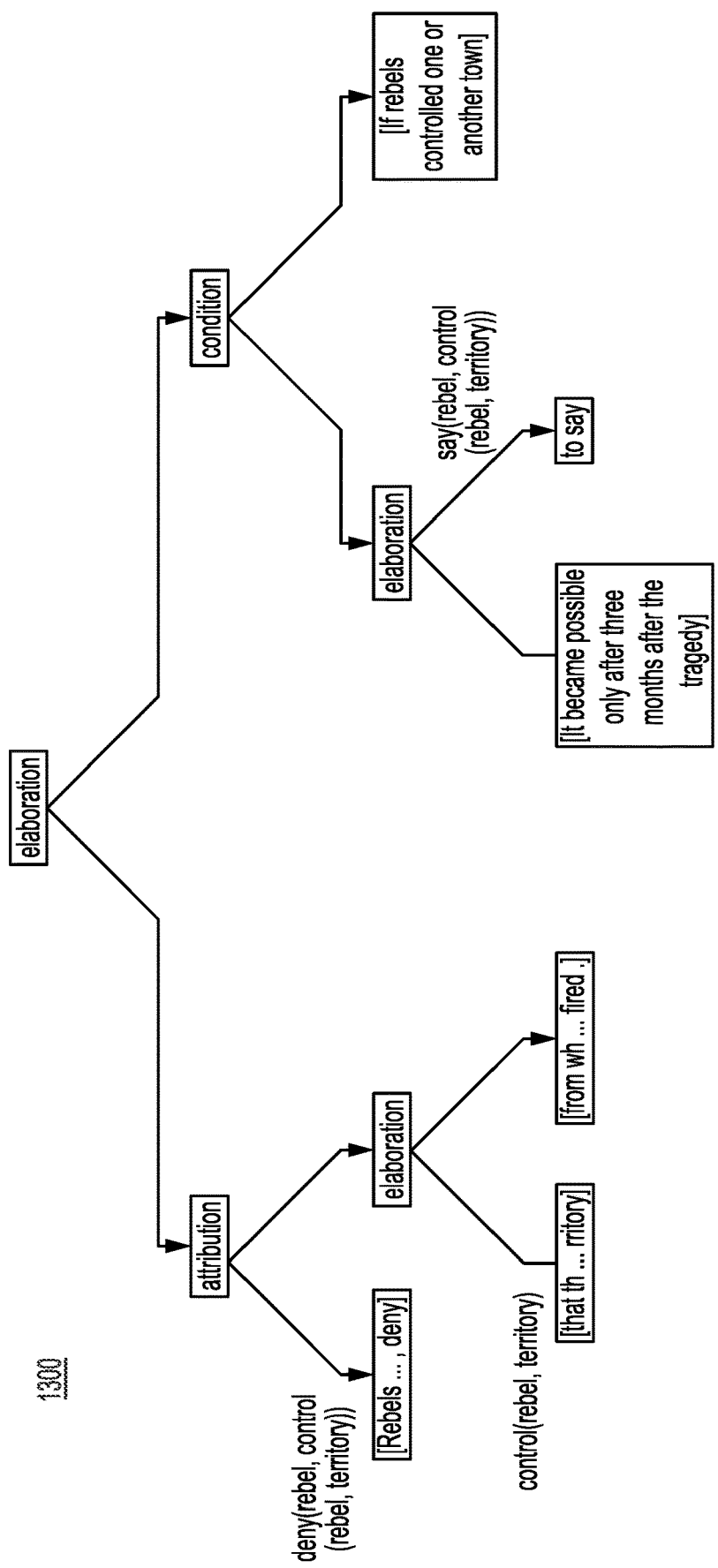
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1190 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 1908), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse (Stimulus, E, Emotion, Experiencer), cause(Stimulus, E), emotional_state(result (E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer):. cause(Stimulus, E), emotional_state(result(E), Emotion, Experiencer).

NP.cause V NP. Example "The teacher's dolls amused the children." syntax Stimulus <+genitive> ('s) V Experiencer. amuse(Stimulus, E, Emotion, Experiencer):. cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E),emotional_state(result(E), Emotion, Experiencer), Pred(result (E), Experiencer).

Communicative actions can be characterized into clusters, for example:

Verbs with Predicative Complements (Appoint, characterize, dub, declare, conjecture, masquerade, orphan, captain, consider, classify), Verbs of Perception (See, sight, peer).

Verbs of Psychological State (Amuse, admire, marvel, appeal), Verbs of Desire (Want, long).

Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 1915. Topical similarity between question and answer can expressed as common sub-graphs of parse thickets. The higher the number of common graph nodes, the higher the similarity.

Figure 14:
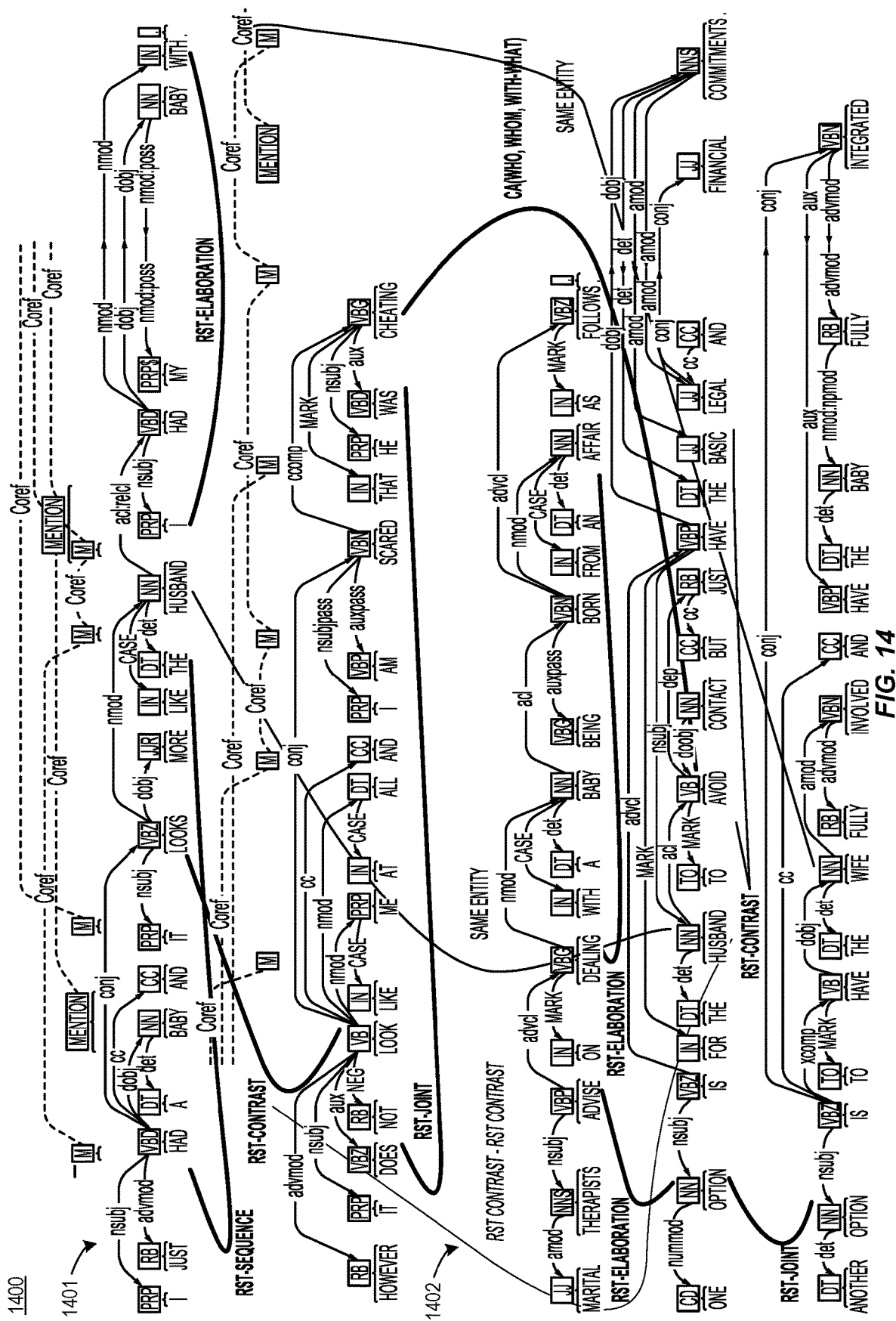
FIG. 14 illustrates parse thickets in accordance with an aspect.

FIG. 14 illustrates parse thickets in accordance with an aspect. FIG. 14 depicts parse thicket 1400 including a parse tree for a request 1401, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={$action_1$, $action_2$ . . . $action_n$} is a finite set of vertices corresponding to communicative actions, and A is a finite set of labeled arcs (ordered pairs of vertices), classified as follows:

Each arc $action_i$, $action_j \in A_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_j=s_i$ or different subjects. Each arc $action_i$, $action_j \in A_{cause}$ corresponds to an attack relationship between $action_i$ and $action_j$ indicating that the cause of $action_i$ in conflict with the subject or cause of $action_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 1913). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)\hat{}rst2(N2,S2,W2,R2)=(rst1\hat{}rst2)$$
$$(N1\hat{}N2,S1\hat{}S2,W1\hat{}W2,R1\hat{}R2).$$

The texts in N1, S1, W1, R1 are subject to generalization as phrases. For example, rst1^rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1)^sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 1915, Volume 49, Issue 2.

For example, the meaning of rst–background^rst–enablement=(S increases the ability of R to comprehend an element in N)^(R comprehending S increases the ability of R to perform the action in N)=increase-VB the-DT ability-NN of-IN R-NN to-IN.

Because the relations rst–background^rst–enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
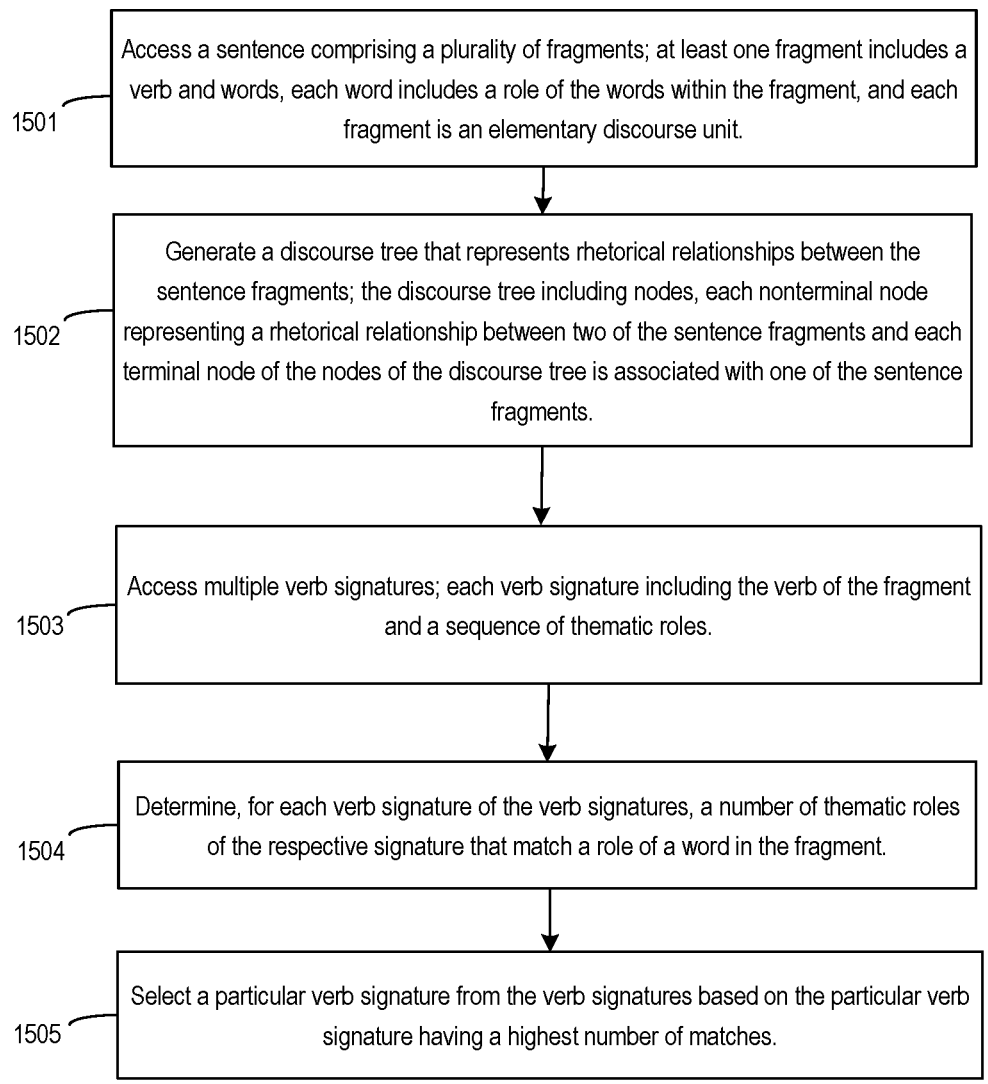
FIG. 15 illustrates an exemplary process for building a communicative discourse tree in accordance with an aspect.

FIG. 15 illustrates an exemplary process for building a communicative discourse tree in accordance with an aspect. Rhetoric classification autonomous agent 102 can implement process 1500. As discussed, communicative discourse trees enable improved search engine results.

At block 1501, process 1500 involves accessing a sentence comprising fragments. At least one fragment includes a verb and words and each word includes a role of the words within the fragment, and each fragment is an elementary discourse unit. For example, rhetoric classification autonomous agent 102 accesses a sentence such as "Rebels, the self-proclaimed Donetsk People's Republic, deny that they controlled the territory from which the missile was allegedly fired" as described with respect to FIG. 13.

Continuing the example, rhetoric classification autonomous agent 102 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, rhetoric classification autonomous agent 102 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, rhetoric classification autonomous agent 102 accesses a list of verbs, e.g., from VerbNet. Each verb matches or is related to the verb of the fragment. For example, the for the first fragment, the verb is "deny." Accordingly, rhetoric classification autonomous agent 102 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," rhetoric classification autonomous agent 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Rhetoric classification autonomous agent 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 1504, process 1500 involves determining, for each verb signature of the verb signatures, a number of thematic roles of the respective signature that match a role of a word in the fragment. For the first fragment, rhetorical classification autonomous agent 102 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Using Communicative Discourse Trees to Facilitate Recommendations

Aspects of the present disclosure relate to improvements recommendation systems that generate an appropriate recommendation from analyzing user utterances and determine an optimal position in a sequence of utterances to insert the recommendation. For instance, aspects of the present disclosure relate to autonomous agents that track utterances in a conversation (for example, between users and/or with autonomous agents), analyze emotion of utterances, determine appropriate recommendations, then join the conversation at an appropriate time. Certain aspects use information extraction, discourse and argumentation analyses, as well as dialogue management techniques to compute a recommendation for a product or service, as inferred from the conversation. Certain aspects are therefore less intrusive than previous systems, which often require that a user answer questions to determine interests. In some cases, a user can explicitly ask for such a recommendation.

Disclosed solutions can be used in at least two scenarios, each of which can occur in either a problem-solving or a general information acquisition setting:

(1) A User—Human customer service agent dialogue, where an automated advertisement agent tracks this dialogue and inserts its utterances with recommendation; and (2) User—an autonomous customer service agent, for example, one or more agents from the same entity that are resolving a customer problem and providing product/service recommendations at the same time.

Figure 16:
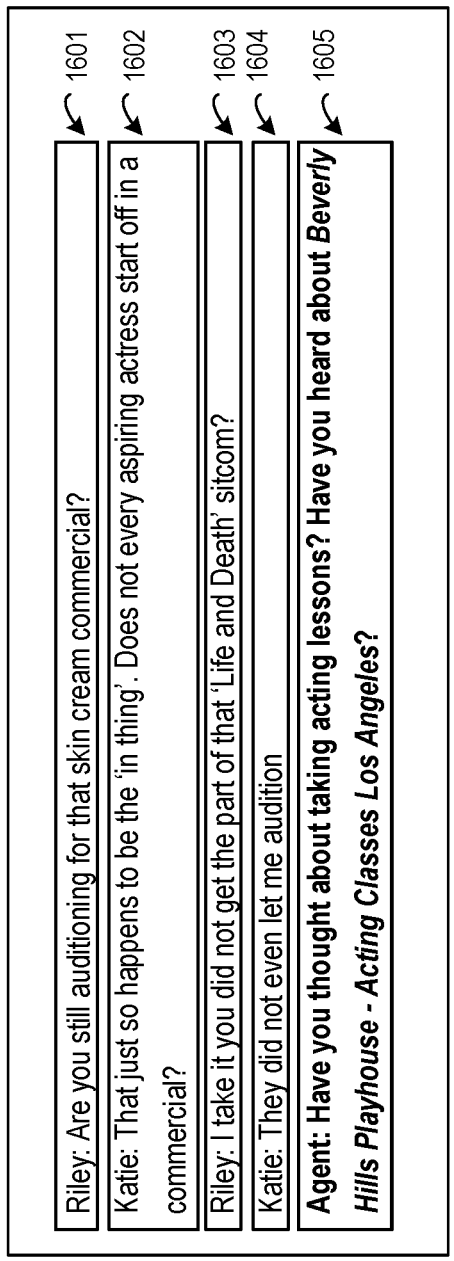
FIG. 16 illustrates an example of an intrusive approach to entering a conversation between two users, in accordance with an aspect.

FIG. 16 illustrates an example of an intrusive approach to entering a conversation between two users, in accordance with an aspect. FIG. 16 depicts utterances 1601-1605. As can be seen, utterances 1601-1604 are between two users. An autonomous agent intervenes in a natural manner at utterance 1605. The agent poses additional factual questions that an autonomous agent can answer. As can be seen, this approach illustrated by FIG. 16 is rather intrusive. The "Agent" abruptly interrupts the flow of conversation. By contrast, FIG. 17 illustrates an improved autonomous agent.

FIG. 17 illustrates an example of an improved approach to entering a conversation, in accordance with an aspect. FIG. 17 depicts utterances 1701-1708. As can be seen, in utterances 1701-1707, a user ("user") interacts with an autonomous agent ("agent"). The expert can be a human (e.g. speaking via a device) or an agent. The system analyzes the utterances and determines a response that addresses the needs of the user. After analyzing the utterances spoken by the user (e.g., 1801, 1803, 1805, and 1807), "Agent 2" interjects with a response that is timely and helpful at utterance 1808.

FIG. 18 illustrates an example of a dialogue with successful recommendation, in accordance with an aspect. FIG. 18 depicts utterances 1801-1814. As can be seen, in utterances 1801-1813, a user interacts with an autonomous agent ("Expert") in a restaurant reservation scenario. In utterance 1814, an agent sets forth a recommendation after analyzing utterances 1801-1813. As can be seen, such a recommendation approach is effective if a user is in a mood for recommendation and is ready to spend time providing information. However, in many cases, a user neither seeks nor expects a recommendation. In the course of a customer support session, an explicit product recommendation by an agent might be a last thing this user is expecting. That is why an unsolicited recommendation during such session should be acceptable as is; no additional clarification steps for the desired parameters of the product being recommended should be required. A recommendation during a session may only have a single chance to trigger a user's interest and therefore should not only be relevant, but also timely. Therefore, FIG. 18 provides an improved approach relative to other recommendation approaches.

FIG. 19 illustrates an example of an improved approach to entering a conversation, in accordance with an aspect. FIG. 19 depicts a session of an agent in a domain of car repair. FIG. 19 depicts utterances 1901-1903. As can be seen, these utterances are concise and detailed, each with proper explanation and argumentation patterns. The entity at issue is "spark plugs." The agent does not need to ask the user additional questions for parameters of the entity being recommended. On the contrary, two utterances of the user are sufficient to determine the point of user pain and propose a business or service that might resolve the user's issues.

As explained, to facilitate improved autonomous agents, disclosed solutions use one or more techniques, which can collectively be referred to as an intent-entity-context-response principle. The techniques include: (1) determining a user's intent, or conversational action, which is performed in part via natural language classification; (2) extracting the entities in the user's utterances through keyword matching; (3) obtaining a context of the current and prior turns in the conversation and (4) presenting the response back to the user, in text or voice.

Figure 20:
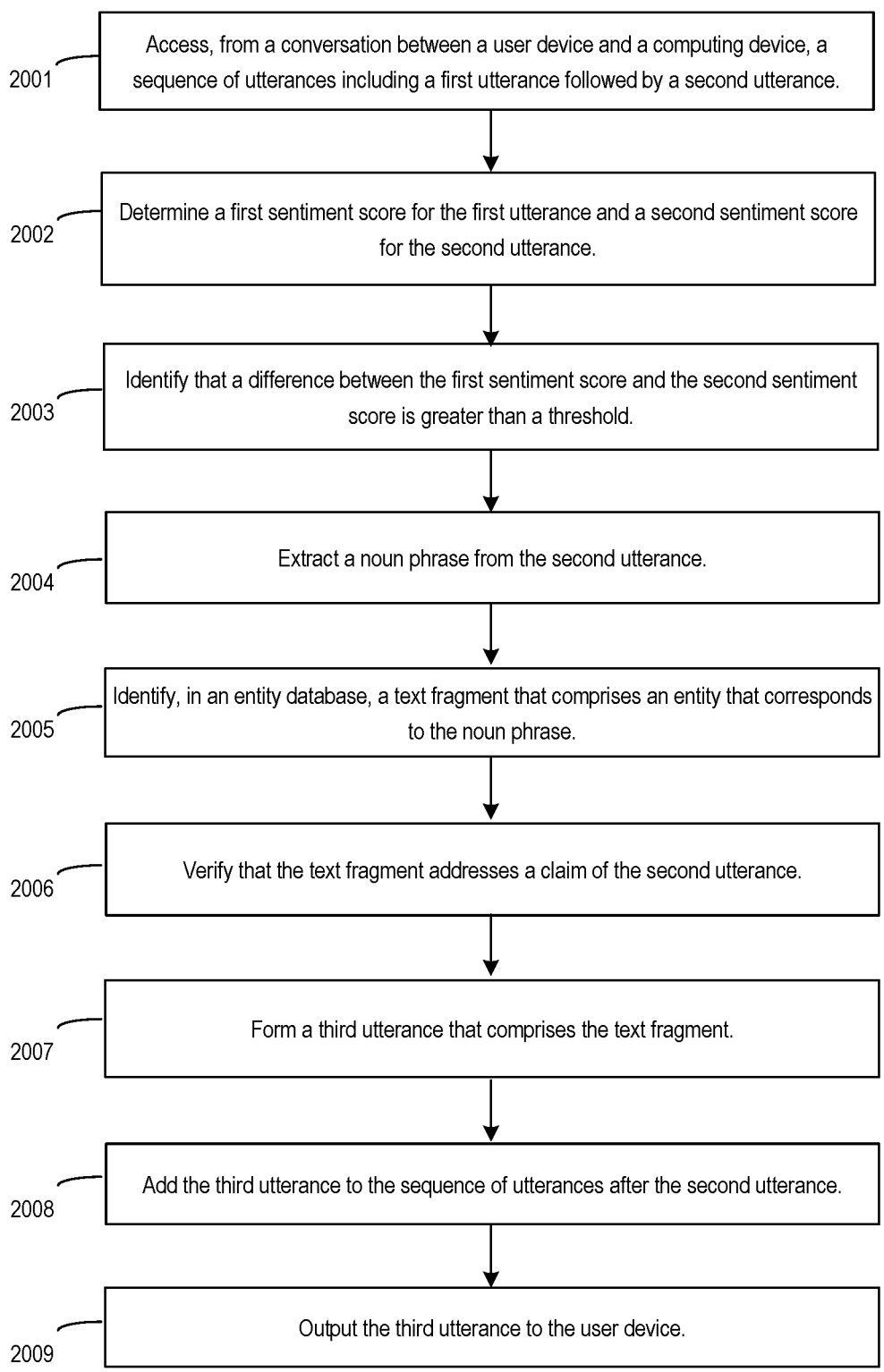
FIG. 20 illustrates an example of a process for determining a recommendation, in accordance with an aspect.

FIG. 20 illustrates an example of a process 2000 for determining a recommendation, in accordance with an aspect. For illustrative purposes, process 2000 is discussed with respect to FIG. 1, e.g., autonomous agent 102, entity database 110, and classification model 120.

At block 2001, process 2000 involves accessing, from a conversation between a user device and a computing device, a sequence of utterances comprising a first utterance followed by a second utterance. Examples of sequences of utterances are depicted in FIGS. 16-19. The utterances can be from an autonomous agent and/or a device, for example an autonomous agent. For example, a sequence of utterances can represent a conversation between two users or between one user and one agent.

In an illustrative example, autonomous agent 102 accesses an electronic conversation occurring between two user devices:

[Device 1] Mike: "Hey, what's up dude?"

[Device 2] Peter: "Not much. I am looking for a DVD to rent but I am fed up with all these. Have seen most of them already"

[Device 1] Mike: "Anything worth seeing at movie theater?"

[Device 2] Peter: "Nah. Just kids movies, sci-fi and cheesy romantic comedies."

In this example, autonomous agent 102 continuously monitors the utterances of one user device. In this example, autonomous agent 102 accesses the first utterance from device 2: "Not much . . . most of them already" and the second utterance from device 2: "Nah. Just kids movies, sci-fi and cheesy romantic comedies."

At block 2002, process 2000 involves determining a first sentiment score for the first utterance and a second sentiment score for the second utterance. Emotion in conversation can be a useful indicator. Conversations are rich with emotions that, with a suitable computing system, can be analyzed. People communicate with others to exchange information and improve social bonding. To exchange and share ideas, people frequently communicate with others using certain dialog flow patterns. Usually, humans do not rigidly answer questions of others and instead wait for the next question. By contrast, conversation participants may first respond to previous context and only then propose their own questions and suggestions. In this way, people show their attention to the words of others and confirm that they are willing to continue the conversation. Daily conversations are rich in emotion. By expressing emotions, people show their mutual respect, empathy and understanding to each other, and thus improve the relationships. Determining the emotional content of utterances can use communicative discourse trees and/or keyword analysis. Accordingly, tracking sentiments of a dialogue can result in an improved and more effective recommendation.

Additionally, tracking sentiments and the strength of the emotion of the sentiments enables a determination of when to insert a recommendation. For example, if a sentiment is not too negative and emotion is not too strong, introducing a recommendation may not be appropriate as any there is not an indication of conflict or any conflict might be resolved. However, if the detected sentiment and emotions are too negative, a recommendation may be helpful.

As such, each sentiment score indicates an emotion indicated by the respective utterance. For example, a sentiment score can be on a scale that ranges from negative emotion (e.g., angry, upset) to positive emotion (e.g., happy, elated). In a further example, the sentiment scale is a numerical scale that is from −1 (negative) to +1 (positive).

Different methods can be used to determine a sentiment score. In a keyword-based approach, autonomous agent 102 analyzes the first utterance and the second utterance separately. Autonomous agent 102 identifies, in each utterance, any keywords that indicate sentiment. Examples of such keywords include bad, good, adequate, adjustable, admirable, adorable, regret, indifferent, disappointed, doubts, outmaneuvered. Each keyword can have an associated sentiment score (for example, on a scale from negative to positive). Autonomous agent 102 determines, for each utterance, a sentiment score of the keywords in the utterance. In some cases, statistical metrics can be used such median, mean, or mode of the keyword scores.

Continuing the above example, autonomous agent 102 determines a sentiment score for the first utterance and the second utterance. In this example, autonomous agent 102 determines a sentiment score of 0 for the first utterance and −0.6 for the second utterance.

A machine-learning based approach can be used instead of or in addition to the keyword-based approach. For example, autonomous agent 102 can create a communicative discourse tree from each utterance. An example of a process for creating a communicative discourse tree is shown in FIG. 16 and accompanying text. Therefore, autonomous agent 102 creates a first communicative discourse tree for the first utterance and a second communicative discourse tree for the second utterance. The communicative discourse trees are provided to a trained machine-learning model such as classification model 120. In turn, classification model 120 outputs a score indicative of the sentiment of the text. As discussed previously, a sentiment score can range from −1 (negative) to 1 (positive).

The classification model 120 is previously trained to identify emotions based on input communicative discourse trees for which emotion associations are known. For instance, suitable training data includes segments of text that are verified to represent a positive or negative emotion (or any variant thereof) is provided iteratively to classification model 120. In turn, classification model 120 learns to predict sentiment from text.

At block 2003, process 2000 involves identifying that a difference between the first sentiment score and the second sentiment score is greater than a threshold. The threshold can indicate that inserting a recommendation is appropriate. Autonomous agent 102 performs a comparison of the sentiment score of the first utterance and the sentiment score of the second utterance. If a difference between the first sentiment score and the second sentiment score is greater than a threshold, then process 2000 continues to block 2004. An example of a suitable threshold is 0.5 on a −1 (negative) to 1 (positive) sentiment score scale.

Continuing the above example, autonomous agent 102 determines a difference between the sentiment score of the first utterance and the sentiment score of the second utterance. In this case, the difference is 0.6. Autonomous agent 102 identifies that the difference is greater than a threshold of 0.5, and therefore continues to block 2004.

At block 2004, process 2000 involves extracting a noun phrase from the second utterance. Noun phrases can be subjects, direct objects, objects of a preposition, or indirect objects.

Continuing the above example, autonomous agent 102 identifies a noun phrase from the second utterance, which is "Nah. Just kids movies, sci-fi and cheesy romantic comedies." Autonomous agent 102 identifies "movies" from the second utterance. Entity extraction can be performed by keyword-based lookup systems or trained machine-learning models.

In some cases, entity extraction is performed by using the Stanford Natural Language Processor (NLP), augmented by the product-specific entity rules and product-specific lookup such as a product catalogue (e.g., eBay). Product-related named entities can also be verified by consulting a search Application Programming Interface.

At block 2005, process 2000 identifying, in an entity database, a text fragment that includes an entity that corresponds to the noun phrase. Examples of entities includes products and services. An entity database can include an ontology, which can be for a specific domain (e.g., finance or law). An example of an ontology is shown with respect to FIG. 21. An example process for creating an ontology is discussed further with respect to FIG. 22. In some cases, an entity can be a name of a product or a service. Autonomous agent 102 can use any indexing and/or searching techniques to search entity database 110. For example, autonomous agent 102 can index the entity database with keywords occurring in entries of entity database 110.

As discussed, in some scenarios, a popular product or service that might meet a user's preferences may be recommended. But in a situation in which an agent is joining a conversation, a recommended product or service must be related to the product which is the main entity of the users problem to be resolved. Moreover, a feature of the product being recommended must address the problem caused by the respective feature of the problematic product being communicated with a customer service agent or other people. To be a good recommendation, it needs to relate to the seed product and to its features and attributes which are the subjects of the customer service agent conversation.

TABLE 2

Examples of seed products and the ones being recommended, with features

| Product (seed) that is the subject of the problem being resolved | Seed's problematic attribute or feature that is a focus of a conversation | Product to be recommended | Recommended attribute/feature to solve problem | Search query |
|---|---|---|---|---|
| Checking account | No overdraft protection | Saving account | Linked with checking for overdraft protection | X for checking account with overdraft protection |
| Hotel @ <location> | No dogs allowed | Apartment | Dog friendly | Dog friendly apartment X @ <location> |
| Flight to <destination> | Ticket is not changeable | Flight insured for change of plans | Coverage for change of plans/ air ticket change | Travel insurance for flight by X to <destination> |
| Camping tent of <brand> | Hard to pitch | Self-pitching tent | Tube frames allowing for self-pitching | Camping tent of <brand> X with self-pitching |
| Auto insurance from X | Does not cover roadside assistance | Additional coverage | Covering roadside assistance | Additional coverage X with roadside assistance |

Some cases of user problems in various domains follow:

A customer does not maintain a positive balance carefully and now wants to avoid NSF in the future;

A traveler with a pet finds himself in a hotel that does not allow dogs;

A traveler got a non-changeable air ticket and now wants to change the flight.

In most of these cases the features of products and services were disclosed to customers, but they did not pay enough attention. Once these customers find themselves in a situation where the limited product features presented a significant inconvenience, they contact customer service and complain. This is a good time to recommend an alternative product or an addition to a service lacking the limitation that was raised as an issue in a customer service session. A similar recommendation should have occurred when the user acquired this initial, seed product and service, but it is not plausible in most situations because it is hard to assess all limitations and future usability cases in advance.

As shown in Table 2, the queries have a placeholder "X" for product/service name such as account type, accommodation name, air travel company etc. The role of this placeholder in a query is to assure the respective entity type does occur in an acceptable search result.

Context variables must be set by the dialogue service to accommodate variations of entities. Once context variables are set up, then entities or key words can be detected from the conversation. For the development of destination recommendations, the preferences of users like nightlife, restaurants, beaches, are created and captured as entities in the dialogue system based on context variations.

Continuing the example, autonomous agent 102 searches entity database 110 for "movies." Entity database 110 contains the text fragment "New Age Alternative Films Club" that corresponds to the noun phrase "movies."

At block 2006, process 2000 involves verifying that the text fragment addresses a claim of the second utterance. For instance, in the case that the text fragment corresponds to a recommended product, the verification ensures that the product will address a customer's problem. To address the concerns indicated by the change in sentiment of the user, autonomous agent 102 verifies that the text fragment addresses the concerns raised by the user. Communicative discourse trees and/or the evaluation of logic formulas can be used. For example, if a user states that "my checking account is bad," then the agent's recommendation should address this issue. An example of a suitable agent response therefore is "this new checking account addresses your concerns as it has overdraft protection."

To form an argument representation, CDTs are built and improved by using the rules specifically targeting exact rhetorical relations interpretable in terms of arguments. These rules are a basis for an addition rhetorical parser that updates the rhetorical relations established by a conventional RST parser which determines the generic "elaboration" relation that needs to be specified to denote Cause, reason, explanation, conclusion and others to be properly interpreted as we form a representation for an argument. Cause, reason, explanation, and conclusion are used to build reason-cause formulas to build a recommendation.

For instance autonomous agent 102 generates a first communicative discourse tree from the text fragment (e.g., the text originating from the entity database), and a second communicative discourse tree from the second utterance (e.g. from the user device). An example of a process for generating a communicative discourse tree is described with respect to FIG. 15. Autonomous agent 102 can use any two utterances from any users in the conversation. In an example, two or more people are conversing. Once a current utterance constitutes an abrupt change of sentiment, the autonomous agent 102 formulates a recommendation based on the abrupt change.

Autonomous agent 102 translates the first communicative discourse tree into a first reason-conclusion logical formula and the second communicative discourse tree into a second reason-conclusion logical formula. To do so, autonomous agent 102 uses the reason-conclusion framework to represent regular and nested arguments.

An argument representation algorithm is defined below. This formalism is built upon a propositional language L with the connectives ¬, ∨, ∘, →, ↔. There are also two operators R(.) and C(.) and an additional negation –. Thus, two negation operators are needed: – for denying propositional formulas (¬x denotes that x is false), and – for denying R(.) and C(.).

An argument is a formula of the form R(y): (–)C(x). An argument is a reason for concluding a claim. It has two main parts: premises (the reason) and a conclusion. The functions R and C respectively play the roles of giving reason and concluding. Indeed, an argument is interpreted as follows: its conclusion holds because it follows, according to a given notion, from the premises. The notion refers to the nature of the link between them (e.g., the premises imply the conclusion), formally identified by the colon in the definition. However, the contents may be true while the functions do not hold and vice versa. The intuitive reading is as follows:

R(y): C(x) means that "y is a reason for concluding x"

R(y): –C(x) means that "y is a reason for not concluding x"

Handling nested arguments are important for finding a defeating answer since it is insufficient to handle only object-level or only meta-level layers of argumentation. It is central to handling texts and dialogues: a support for nested arguments and rejections has to be provided. To illustrate some of the expressive richness of our approach, Table 3 is presented with various forms of arguments and rejections allowed by our definitions (x, y, z, t are propositional formulas to simplify matters). Table 1 is not exhaustive.

If an argument or rejection occurs in a text or dialogue, then we want it to be mined, and we want to be able to represent it in our language. A list of arguments below shows that all the forms can be used as a target for natural language. It indicates how to use our language, rather than suggesting that there is a canonical translation of text in to the formal target language. Translating a natural language sentence into R-C logic is shown in Table 1.

An example is an argument concerning the functionality of a credit card. By default, credit cards work (is operational), especially if there is a positive account balance. However, there are exceptions: for whatever reason a bank may decline a transaction.

These examples illustrate that the inner and outer reason R as well as claim C can be potentially identified using argument mining techniques. and then by recursion, the inner reasons and claims can be identified by argument mining techniques. Thus, the nested structure appears better suited as a target language for arguments as they arise in natural language dialogues and texts.

TABLE 3

| | Discourse representation or arguments and their rejections | |
|---|---|---|
| Basic arguments | My credit card is operational o(c). It is not blocked ¬b(c) | R (¬b(c)):C(o(c)) |
| | My credit card has been compromised m(c). It is blocked | R (b(c)):C(m(c)) |
| | Credit card is operational. Thus, it is not possible to conclude that a charge can be declined (d(c) | R(o(c)):–C(d(c)) |
| Single-embedding meta-arguments in reason R | That debit card can be used u(c) because it is operational, is a reason to conclude that the balance is positive (p(b)) | R(R(u(c)):C(o(c))):C(p(b)) |
| | That card is not declined because it has a positive balance is a reason to conclude that it has not been compromised (m(c)). | R(R(¬d(c)):C(p(b))):C(¬m(c)) |
| | Card is operational because its balance is positive, so we cannot conclude that it was blocked | R(R(p(b)):C(o(c))):–C(b(c)) |
| Single-embedding meta-arguments in conclusion C | The balance on the card is negative. Thus, the charge/use attempt will lead to non-sufficient fund fee (nsf(c)) | R(¬b(c)):C(u(c):C(nsf(c))) |
| | The fact that a card has been declined in the past is a reason to conclude that having a positive balance is not a sufficient reason for a credit card to always be operational | R(d(c)):C(–R(p(b)):C(o(c))) |
| | The fact that all credit cards of team members are operational is a reason for not concluding that a decline charge of a particular high cost transaction h(c) is a reason for team credit cards to be compromised | R(o(c)):–C(R(h(c)):C(m(c))) |
| Double-embedding of meta-arguments | Bad credit history (ch(b)) leads to a decline of a credit card application (d(a(c))). Once a user is unable to use credit card (u(c)) it is hard to get a loan (l(u)) | R(R(ch(b)):C(d(a(c)))):C(R(u(c)):C(l(u))) |
| | Good credit history (ch(g)) usually tells us that a credit card application is not declined (d(a(c))). However, we cannot imply that successful credit card application leads to a loan approval (other factors play the role as well) | R(R(ch(g)):C(d(a(c)))):–C(R(d(a(c))):C(l(u))) |

TABLE 4

| Discourse trees for selected examples | | |
|---|---|---|
| My credit card is operational o(c). It is not blocked ¬b(c) | | R (¬b(c)):C(o(c)) |
| My credit card has been compromised m(c). It is blocked | | R (b(c)):C(m(c)) |
| Credit card is operational. Thus, it is not possible to conclude that a charge can be declined (d(c)) | | R(o(c)):–C(d(c)) |
| That debit card can be used u(c) because it is operational, is a reason to conclude that the balance is positive (p(b)) | cause explanation (LeftToRight) TEXT:That debit card can be used, TEXT:because it is operational, cause (LeftToRight) TEXT:is a reason attribution (RightToLeft) TEXT:to conclude TEXT:that the balance is positive | R(R(u(c)):C(o(c))):C(p(b)) |
| That card is not declined because it has a positive balance. It is a reason to conclude that it has not been compromised (m(c)) | | R(R(¬d(c)):C(p(b))):C(¬m(c)) |
| Card is operational because its balance is positive, so we cannot conclude that it was blocked | conclusion (LeftToRight) cause (LeftToRight) TEXT:Card is operational TEXT:because its balance is positive, attribution (RightToLeft) TEXT:so we cannot conclude TEXT:that it was blocked | R(R(p(b)):C(o(c))):–C(b(c)) |
| The balance on the card is negative. Thus the charge or use attempt will lead to non-sufficient fund fee (nsf(c)) | elaboration (LeftToRight) cause (LeftToRight) TEXT:The balance on the card is negative cause(LeftToRight) TEXT:Thus the charge/use attempt will lead to TEXT non-sufficient fund fee | R(¬b(c)):C(u(c):C(nsf(c))) |
| The fact that a card has been declined in the past is a reason to conclude that having a positive balance is not a sufficient reason for a credit card to always be operational | reason(LeftToRight) elaboration (LeftToRight) TEXT:The fact TEXT:that a card has been declined in the past is a reason conclusion(RightToLeft) TEXT:to conclude cause(LeftToRight) TEXT:that having a positive balance is not a sufficient reason TEXT: for a credit card to always be operational | R(d(c)):C(–R(p(b)):C(o(c))) |
| The fact that all credit cards of team members are operational is a reason for not concluding that a decline charge of a particular high cost transaction h(c) is a reason for team credit cards to be compromised | elaboration (LeftToRight) TEXT:The fact reason(LeftToRight) TEXT:that all credit cards of team members are operational is a reason conclusion(RightToLeft) TEXT:for not concluding cause(LeftToRight) TEXT:that a decline charge of a particular high cost transaction is a reason for team credit cards TEXT:to be compromised | R(o(c)):–C(R(h(c)):C(m(c))) |
| Bad credit history (ch(b)) leads to a decline of a credit card application (d(a(c))). Thus once a user is unable to use credit card (u(c)) it | cause(LeftToRight) cause(LeftToRight) TEXT:Bad credit history TEXT:leads to a decline of a credit card application. cause (LeftToRight) TEXT: Thus once a user is unable to use credit card | R(R(ch(b)):C(d(a(c)))):C(R(u(c)):C(l(u))) |

TABLE 4-continued

Discourse trees for selected examples

| | | |
|---|---|---|
| is hard to get a loan (l(u)) | TEXT:it is hard to get a loan, | |
| Good credit history (ch(g)) usually tells us that a credit card application is not declined (d(a(c))). However, we cannot imply that successful credit card application leads to a loan approval (other factors play the role as well) | explanation (RightToLeft) cause (RightToLeft) TEXT:Good credit history usually tells us TEXT:that a credit card application is not declined. cause TEXT:However, we cannot imply that successful credit card application TEXT: leads to a loan approval. | R(R(ch(g)):C(d(a(c)))):−C(R(d(a(c))):C(l(u))) |

The templates in Table 4 can be used to extract logical atoms from EDUs, translate rhetorical relations into R-C operators and form a logical representation of arguments.

A set of arguments and their rejections as a set of formulae which is a subject of a reasoning system application. A consequence operator ⊢ is the least closure of a set of inference rules extended with one meta-rule.

A meta-rule expresses that one can reverse any inference rule $$\frac{R(y):F}{-R(y):G}$$

into $$\frac{R(y):G}{-R(y):F}$$

This inference rule reversing process occur whenever negation occurs in front of a leftmost "R" so that, in the general case, an inference rule 1 where i, j∈ {0, 1}

As to the regular inference rules, we start from consistency:

$$\frac{\mathcal{R}(y):C(x)}{-\mathcal{R}(y):-C(x)}$$

$$\frac{\mathcal{R}(y):C(x)}{\mathcal{R}(y):-C(-x)}$$

Reasons are interchangeable. This rules is referred to as mutual support $$\frac{\mathcal{R}(y):C(x)\ \mathcal{R}(x):C(y)\ \mathcal{R}(y):C(z)}{\mathcal{R}(x):C(z)}$$

The next rule gathers different reasons for the same conclusion within a single argument:

$$\frac{\mathcal{R}(y):C(x)\ \mathcal{R}(z):C(x)}{\mathcal{R}(y\land z):C(x)}$$

Cautious monotonicity means that the reason of an argument can be expanded with any premise it justifies. Cut expresses a form of minimality of the reason of an argument.

$$\frac{\mathcal{R}(y):C(z)\ \mathcal{R}(y):C(x)}{\mathcal{R}(y\land z):C(x)}$$

$$\frac{\mathcal{R}(y\land z):C(x)\ \mathcal{R}(y):C(z)}{\mathcal{R}(y):C(x)}$$

The two next rules describe nesting of R(.) and C(.). Exportation shows how to simplify meta-arguments and Permutation shows that for some forms of meta-arguments, permutations of reasons are possible.

$$\frac{\mathcal{R}(y):C(\mathcal{R}(z):C(x))}{\mathcal{R}(y\land z):C(x)}$$

$$\frac{\mathcal{R}(y):C(\mathcal{R}(z):C(x))}{\mathcal{R}(z):C(\mathcal{R}(y):C(x))}$$

When the smallest inference relation is obeying the rules above, reflexivity, monotonicity and cut hold, meaning that with the consequence relation, manipulation of arguments by the inference rules is well-founded (Tarski 1956). Indeed Let Δ be a set of (rejections of) arguments. Let α, and β be arguments.

Δα if α∈ Δ (Reflexivity)
Δ∪{α}β if Δβ (Monotonicity)
Δβ if Δ∪{α}β and Δα (Cut)

Further, the consequence relation is paraconsistent in the sense that it is not trivialized by contradiction: not all formulae in language L follow from contradiction.

Autonomous agent 102 translates the first communicative discourse tree into a first reason-conclusion logical formula and the second communicative discourse tree into a second reason-conclusion logical formula. The translating can involve identifying, from an elementary discourse unit in the respective communicative discourse tree, logical atoms that correspond to text of the elementary discourse unit.

An "atom," or an atomic formula, is a formula with no deeper propositional structure, that is, a formula that contains no logical connectives or equivalently, a formula that has no strict sub-formulas. Atoms are thus the simplest well-formed formulas of logic. An example of an atom is operational (credit card), which evaluates to 1 if the credit card is operational and 0 if the credit card is not operational. A logical formula can contain one or more atoms, e.g., (if v(y) AND z(a)).

The translating can further involve identifying, from the respective communicative discourse tree, a rhetorical relation that corresponds to a nucleus elementary discourse unit and a satellite elementary discourse unit and is included in a subset of rhetorical relations in the respective communicative discourse tree. The translating can further involve constructing, from the rhetorical relation, a reason-conclusion logical formula by mapping the nucleus elementary discourse unit to a reason and the satellite elementary discourse unit to a conclusion. The translating can further involve substituting logical atoms associated with the nucleus elementary discourse unit to the reason. The translating can further involve substituting logical atoms associated with the satellite elementary discourse unit to the conclusion. Autonomous agent 102 identifies that the first reason-conclusion logical formula supports the second reason-conclusion logical formula, e.g., that the text fragment supports the concerns raised by the user in the second utterance. The logical formulas are evaluated.

Returning to process 2000, at block 2007, process 2000 involves forming a third utterance that includes the text fragment.

Continuing the example, autonomous agent 102 creates an utterance "If you are looking for something new you should come to a meeting of the New Age Alternative Films Club" using the text fragment "New Age Alternative Films Club."

At block 2008, process 2000 involves adding the third utterance to the sequence of utterances after the second utterance. Continuing the example above, autonomous agent 102 inserts the third utterance in dialogue 170 as such:

[Device 1] Mike: "Hey, what's up dude?"
[Device 2] Peter: "Not much. I am looking for a DVD to rent but I am fed up with all these. Have seen most of them already"
[Device 1] Mike: "Anything worth seeing at movie theater?"
[Device 2] Peter: "Nah. Just kids movies, sci-fi and cheesy romantic comedies."
[Agent] "If you are looking for something new you should come to a meeting of the New Age Alternative Films Club"

At block 2009, process 2000 involves outputting the third utterance to the user device. Computing device 101 can transmit the third utterance to user device 160.

Figure 21:
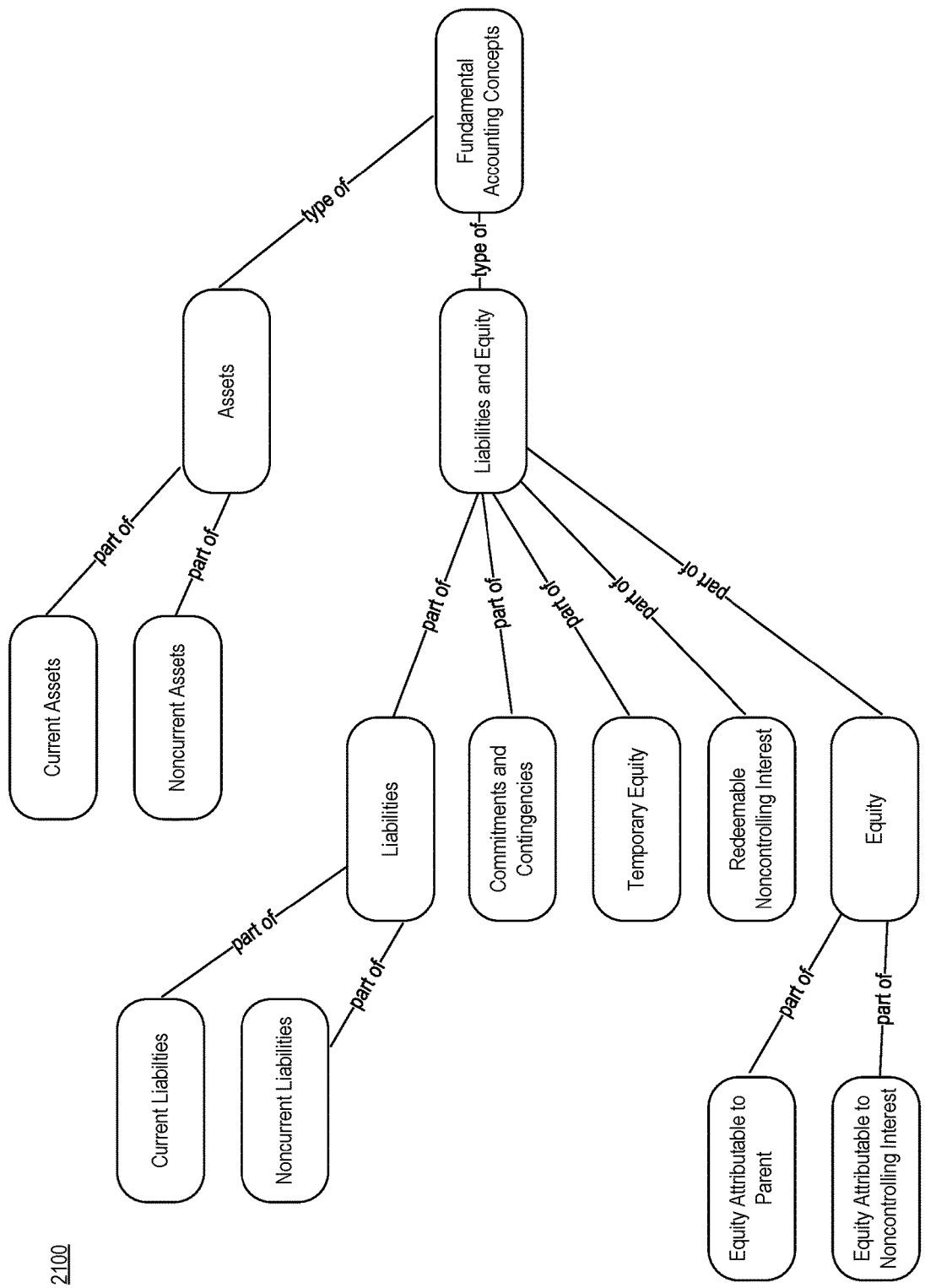
FIG. 21 depicts a fragment of an ontology related to a financial document, in accordance with an aspect.

FIG. 21 depicts a fragment of an ontology related to financial document, in accordance with an aspect. An ontology like the one shown in FIG. 21 is used to identify a parameter/feature of the seed entity that is the focus of a conversation with an agent. Relations in ontology are Part-of Type-of Same-as, Instance-of Defines, Defined-by and others feature of a product is connected with this product by Part-of Type-of or Instance-of Once an entity is identified in a noun phrase, the ontology is used to find an occurrence of its attribute or feature. Computing device 101 can create an ontology, or one can be provided and used by autonomous agent 102.

Creating an Ontology

Figure 22:
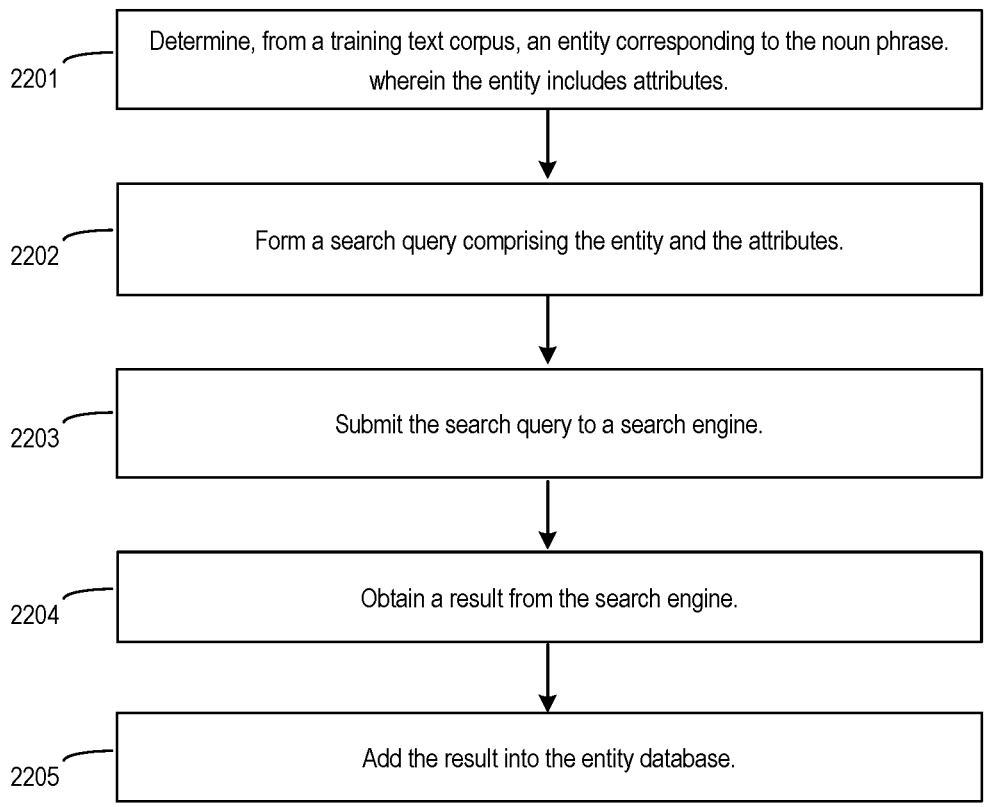
FIG. 22 illustrates an example of a process for constructing an ontology, in accordance with an aspect.

FIG. 22 illustrates an example of a process 2200 for constructing an ontology, in accordance with an aspect. As discussed with respect to block 2005 of process 2000, an ontology can be used to represent entities that can form the basis of recommendations. The recommendations can be recommendations of products that autonomous agent 102 can recommend. Autonomous agent 102 can create an ontology by using process 2200.

At block 2201, process 2200 involves determining, from a training text corpus, an entity corresponding to the noun phrase. The entity includes attributes. Autonomous agent 102 can identify entities that are synonyms of the noun phrase. For instance, "movie" is a synonym of "film."

At block 2202, process 2200 involves forming a search query comprising the entity and the attributes. Autonomous agent 102 forms a search query from the phrase, e.g., "recent films."

At block 2203, process 2200 involves submitting the search query to a search engine. The search engine can be a search engine for products for a purpose of recommendations. Continuing the example, autonomous agent 102 provides "recent films" into the search engine.

At block 2204, process 2200 involves obtaining a result from the search engine. Continuing the example, the search engine returns "the best movies of 2019," which includes entries such as "Parasite" and "Toy Story 4."

At block 2205, process 2200 involves adding the result into the entity database. Continuing the example, autonomous agent 102 inserts "Parasite" and "Toy Story 4" as entries into the entity database. If the entity database is later queried for "Parasite," e.g., if user mentions this movie, then the entity database is used to map "Parasite" to "movie."

Discourse Structure of the Recommendation

A discourse structure of the recommendation provided to a user device influence the quality of the recommendation.

Figure 23:
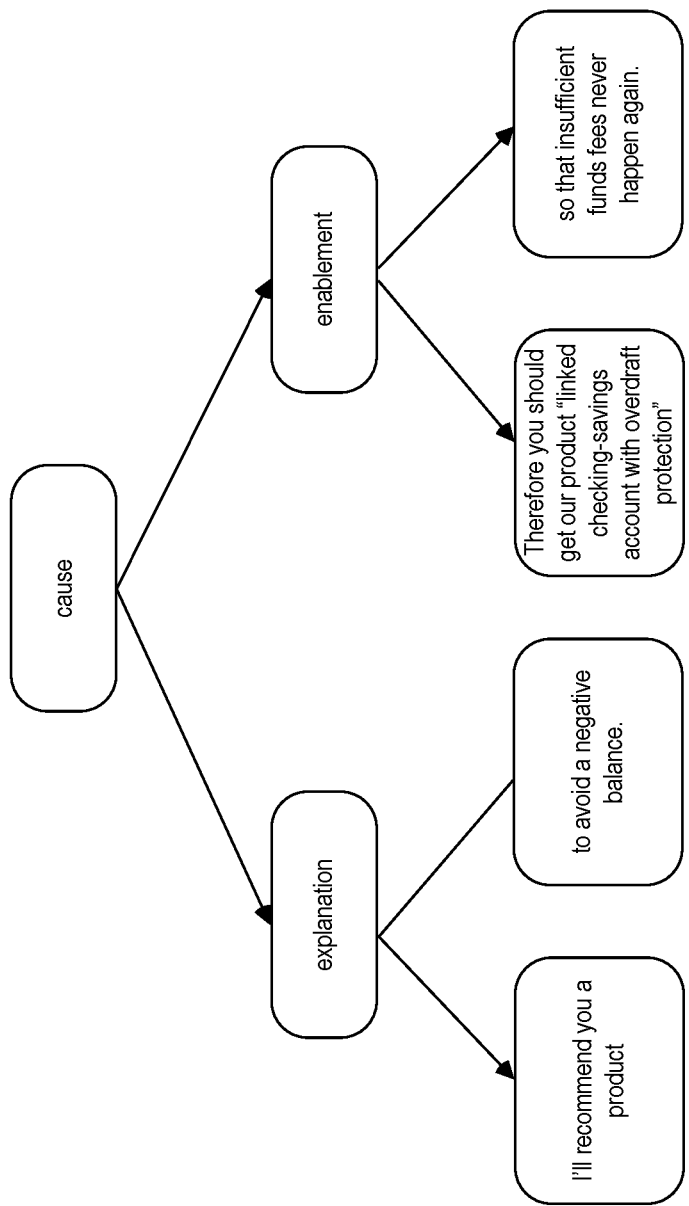
FIG. 23 depicts a discourse tree for a good answer, in accordance with an aspect.

FIG. 23 depicts a discourse tree for a good answer, in accordance with an aspect. As can be seen, discourse tree 2300 includes rhetorical relations, Explanation, Cause, and Enablement. When these rhetorical relations are recognized in the text of the provided recommendation, then a higher chance that this recommendation is reasonable, persuasive and well-argued. Accordingly, in some cases, autonomous agent 102 can use machine-learning or other techniques to verify a presence of these rhetorical relations before providing the recommendation to the user. By contrast, a recommendation with a discourse tree that contains only default rhetorical relations such as Elaboration and Join would not be as effective.

Further, discourse representation of the recommendation must match in terms of argumentation in the discourse representation of the problem description of the product by customer. In other words, these two discourse representations must be in a rhetorical agreement.

Supporting a Recommendation With Explanation and Argument

Explanation

Explanation and persuasion are two important characteristics for convincing users to follow the recommendations. For example, consider the following conversation:

Customer: You charged me unfair NSF but I maintained a positive balance on my account.
Customer service agent: We have to charge NSF to maintain our income, so you should maintain minimum balance.
Good RJC-Agent: I recommend a product such that you avoid a negative balance. You should get our product linked checking-saving account with overdraft protection, so that NSF never happens again.
Marginally Relevant and unpersuasive Agent: Open new account at Base Bank. High Yield interest rates. Open within next week and get a free checking.

Irrelevant Agent: Earn income working from home. No training is necessary. Start making money right now.

Relevant but unpersuasive Agent Get an overdraft protection. Link a saving account with your checking one.

A good example is a free-format text that includes a recommendation as well as its argumentative back up, an explanation why this product would solve a customer problem, as described in the dialogue. Negative examples, in particular, rely on an imperative form of verbs that is heavily used in conventional advertisement.

To ensure a recommendation makes sense to a user, it needs to be backed up by an argument. To find a textual recommendation that will be well perceived by the user, this recommendation should form a well backed up claim where the utterances in the dialogue are premises. This is a special case of argument mining task that can be defined as analyzing a discourse on the pragmatics level and employing a certain argumentation theory (Tuolmin 1958) to model available textual data. An argument mining framework includes two steps: argument extraction and argumentation relation prediction. The latter step may be based on learning or reasoning, or both.

Arguments extraction is the identification of arguments within the input of natural language text. This step may be further split in two different stages such as the detection of argument components (e.g., claim, premises) and the further identification of their textual boundaries. Many approaches have recently been proposed to address such task, that adopt different statistical learning methods.

Relations prediction determines what are the relations holding between the arguments identified in the first stage. This is an extremely complex task, as it involves high-level knowledge representation and reasoning issues. The relations between the arguments may be of heterogeneous nature, like attacks and supports. They are used to build the argument graphs, in which the relations connecting the retrieved arguments (i.e., the nodes in the graph) correspond to the edges. Different learning methods have been employed to address this task, from standard SVMs to Textual Entailment (Cabrio and Villata, 1913). This stage is also in charge of predicting, in structured argumentation, the internal relations of the argument's components, such as the connection between the premises and the claim. A modified Toulmin's model contains five argument components, namely: claim, premise, backing, rebuttal, and refutation.

When annotating a document, any arbitrary token span can be labeled with an argument component; the components do not overlap. The spans are not known in advance and the annotator thus chooses the span and the component type at the same time. All components are optional (they do not have to be present in the argument) except the claim, which is either explicit or implicit. If a token span is not labeled by any argument component, it is not considered as a part of the argument and is later denoted as none (this category is not assigned by the annotators).

Modified Toulmin's model used for annotation of arguments with an instantiated example of a CS dialogue on NSF (FIG. 12). The arrows show relations between argument components; the relations are implicit and inherent in the model. By contrast to the example of original Toulmin's model, no connective phrases are attached to the relations (such as so, unless, etc.).

FIG. 24 illustrates a connection between the utterances to resolve a problem concerning a seed product and a recommendation. FIG. 24 includes dialogue 2400, which includes utterances 2401-2404. In particular, FIG. 24 illustrates a generalized example of a proper correlation between the previous utterances about the seed product P and recommendation R. Here, the pair of products P and R, a recommendation for RP must be supported by the customers' expression of her needs and problems in P.

Continuing the Conversation

Once a recommendation utterance is delivered, the user may choose to continue conversation with the autonomous agent. If so, then the following algorithm is applied:

Input: Recommendations=top-5 recommendations,
Profile=set of user preferences,
Graph=graph representation of user preferences, items, entities, properties
Output: conversation
Profile←Profile+new preferences (items, entities, properties);
Recommendations←PageRank (Graph, Profile);
Show Recommendations;
while User does not accept Recommendations do
Feedback←User feedback;
Refine(Feedback);
Recommendations←PageRank (Graph, Profile);
Show Recommendations;
end To build a conversational grammar for dialogue management, a notion of adjacency-pair is introduced. Sequences of two utterances that are:

1) adjacent (unless separated by an insertion sequence);
2) produced by different speakers;
3) ordered as a first part (which we will refer to also as the initiative) and a second part (which we will refer to also as the response);
4) typed, so that a particular initiative requires a certain type or range of types of response.

Adjacency-pairs are question-answer, greeting-greeting, or offer-acceptance/decline. Where there is a range of potential responses to an initiative (as with offer-acceptance/decline), a ranking operates over the options setting one response as most preferred (in the sense of normal, more usual) and others as less preferred (Bridge 1902). Other than preferred responses are usually lengthy and syntactically more sophisticated. Having produced a first part (utterance) of some pair, the current utterance stops and it is expected that the next speaker will produce one of the allowable second utterance of the same pair. The second part will often proceed right away. However, there frequently appear sequences of turns that intervene between the first and second utterances of a pair; the second utterance is in a holding pattern during the insertion sequence. An insertion sequence will be topically related to the pair of utterances it interrupts and may be used to determine the desired features for providing the second utterance of the original pair. Insertion sequences typically contain further adjacency-pairs, which may themselves be interrupted by further insertion sequences.

Below is a logic program for dialogue management when a conversation with the agent continues, with potentially more recommendations. Prolog notations for the dialogue grammar are used. Variables are capitalized.

1) turn(system, [ ], [(Type, Topic)])→initiative(system, Type, Topic). There are no ongoing pairs. The system starts a new pair.
2) turn(user, [(Type, Topic) Rest], Rest)→response(user, Type, Topic). There is at least one ongoing pair. The user provides a response of the same type and on the same topic, thus completing the pair.
3) turn(system, [(Type, Topic)], [(Type1, Topic1)])→response(system, Type, Topic), initiative(system, Type1, Topic1). There is a single ongoing pair. The system provides a response of the same type and on the same topic. Then the system initiates a new pair of a possibly different type and on a possibly different topic.

4) turn(system, [(Type, Topic), (Type1, Topic)|Rest], [(Type1, Topic)|Rest])→response(system, Type, Topic), initiative(system, Type1, Topic). There are at least two ongoing pairs on the same topic. So the dialogue must have entered an insertion sequence. The system provides a response to complete the most recent pair. The system reminds the user of the ongoing pair. The grammar achieves this by requiring that the system initiate a new pair of the same type and topic as the ongoing one, but it does not push it onto the stack of ongoing pairs, which remains unchanged.

5) turn(user, [(Type, Topic)|_], [(Type1, Topic1)])→response(user, Type, Topic), initiative(user, Type1, Topic1). There is at least one ongoing pair. The user provides a response to complete the pair and initiates a new pair. This aborts any other ongoing pairs so the stack contains only the new pair.

6) turn(user, [(_, Topic)|_], [(Type1, Topic1)])→initiative (user, Type1, Topic1), {Topic\=Topic1}. There is at least one ongoing pair. The user aborts it and initiates something new. We know this is not an insertion sequence because the topic is different.

7) turn(user, [(Type, Topic)|Rest], [(Type1, Topic), (Type, Topic)|Rest])→initiative(user, Type1, Topic). There is at least one ongoing pair. The user begins an insertion sequence by not responding to the ongoing pair but by initiating a new pair on the same topic. Both pairs are now on the stack.

A number of decisions have been made in writing the grammar that constrains the contributions that the system can make to the dialogue. In particular, the system cannot abort pairs: rules 5 and 6 apply only to the user. The system should consider user initiatives.

A search query from the formed product name and its feature is formed, and a search is launched. The search results together form a list of candidates, which are filtered based on the proper argumentation and discourse coordination requirements. This filtering is implemented via argument mining and reasoning techniques. They verify that the recommendation as a claim is logically supported by the previous customer utterance and therefore this recommendation would be convincing for the customer. Rhetorical agreement is verified based on coordination between the discourse trees of previous customer utterances and the discourse tree of the candidate recommendation text. Watson architecture for a conversational travel recommendation system can be used.

Evaluation

To evaluate, obtain human-human dialogues from Customer Complaints and Car Repair datasets are obtained. For the first dataset, we obtain recommendations online from websites like bankrate and Bloomberg. We also acquire recommendation sources from Yelp on restaurants and services such as repair and tuition. For book recommendations, the Amazon/LibraryThing (A/LT) dataset was used. For blogs and forums which can potentially be subject to a recommender agent, carpros and immihelp were used.

To get closer to the customer service agent conversation setting, we selected Relational Strategies in Customer Service Dataset that is a collection of travel-related customer service data from four sources. The conversation logs three commercial customer services and the Airline forums on TripAdvisor.com. For a special case of conversations related to overall product opinion, we employ the Customer Support on Twitter dataset. It includes over 3 million tweets and replies from the biggest brands on Twitter. The datasets to evaluate RJC are enumerated in Table 2.

For scraped and indexed data, we use our own search for products, and for web data we either use APIs of a particular source or search this source via Bing API.

We use various sources of dialogues:
1) Conversational data sets;
2) Scraped from online forums;
3) Cached search results from specific APIs.

TABLE 2

Characteristics for each data source in evaluation of relevant recommendation.

| Source name | # in the dataset | Problem resolution in a dialogue | Origin of data | Source of recommendations |
|---|---|---|---|---|
| Finance | 2190 | Yes | my3cents.com bankrate.com | Web search of Bloomberg, Fidelity, Bankrate for financial products |
| Auto repair | 9300 | Yes | 2carpros.com | Web search for services |
| Sports shopping | 2740 | No | REI and L.L.Bean data from RichRelevance.com | Internal API for product search |
| Home products shopping | 3100 | No | Walmart, HD Supply, OfficeDepot data from RichRelevance.com | eBay product search API |
| Home-related services | | | Yelp reviews | Yelp API |
| Travel | 2430 | No | zicasso.com/travel-reviews, tripadvisor.com reviews Airline forums on TripAdvisor.com | Tripadvisor.com |
| Daily Dialogues | 1900 | Sometimes | (Li et al 1918) | Yelp API |
| Genuine human dialogues | 1900 | Sometimes | (Li et al 1918) ENRON email thread Reddit discourse dataset (Logacheva et al. 1918) | Yelp API, eBay product search API, Tripadvisor.com, Bing Forum search, |

TABLE 2-continued

Characteristics for each data source in evaluation of relevant recommendation.

| Source name | # in the dataset | Problem resolution in a dialogue | Origin of data | Source of recommendations |
|---|---|---|---|---|
| Dialogues constructed from blogs, forums and other sources | 5190 | No | 2carpros.com, immihelp.com, talkhealthpartnership.com, blog.feedspot.com librarything.com/groups. Book recommendations | Bing Web search |
| Dialogues generated from text using doc2dialogue tool | 5190 | No | Web mining of documents on the web in Finance, Legal, Health, Travel | |

Documents in the domain of Finance, Travel, Sports are converted into FAQ-type question answering pairs. The Reddit discourse dataset (Zhang et al., 1917) is manually annotated with dialog-acts via crowd sourcing. The dialog-acts comprise of an answer, a question, humor, an agreement, a disagreement, an appreciation, a negative reaction, an elaboration and an announcement. It comprises conversations from around 9,000 randomly sampled Reddit threads with over 100,000 comments and an average of 12 turns per thread.

The most frequently communicative actions (CAs) in the corpus are Statement-non-opinion, Acknowledge, Statement-opinion, Agree/Accept, Abandoned or Turn Exit, Appreciation, Yes-No-Question, Nonverbal, Yes answers, Conventional-closing. Utterances with underscored CAs are primary candidates for RJC to act.

Overall, it is fairly hard to find a dataset for RJC because most of the conversational datasets are very specific to movies, transportation, restaurants and points of interest. These datasets are extremely limited to domain and conversation style. We do not use dialogue data from public task-oriented dialogues since the conversations are usually very primitive and are confined to a very narrow domain such as hotel and transportation reservations in a given metropolitan area (Budzianowski et al 1919, Schulz et al 1917, Facebook Babi 1919). It is quite difficult to recommend any product or service for such dialogue datasets developed to train chit-chat or task-oriented conversations. Partial exceptions here are the datasets (Li et al 1918, Logacheva et al. 1918).

That is why the dialogue generation tool from an arbitrary document is required to generate dialogues in multiple domains to test RJC extensively. As a result of using this tool, our dialogue datasets are more natural and authentic human conversations than some popular datasets like Twitter Dialog Corpus (Ritter et al., 1911) and Chinese Weibo datasets, constructed by posts and replies on social networks, which are noisy, short and strongly deviate from real conversations.

To verify each component automatically, we develop a pair of implementations for each verification component and assess one against another for the full-size dataset. For each component, the first integration architecture in this pair has this component and the second architecture does not. Each implementation pair is spot-tested individually manually, on a significantly reduced dataset. This approach is similar to a keyword-based assessment of chatbot performance such as BLUE which is not always accurate, but scales well.

To achieve automated evaluation, an automated assessment algorithm is designed and the quality of assessment is evaluated. Assessment algorithm should be different from the recognition algorithm for a given component. We separately estimate the accuracy of the assessment algorithm and of the component itself.

The assessment algorithm is estimated manually with respect to how accurately it is measuring the performance of a system component. The assessment measurement error $\varepsilon = 1 - F1_{assessment\ algorithm}$. We consider the assessment algorithm satisfactory for most evaluations if $\varepsilon < 19\%$. Hence $\varepsilon$ is estimated manually, but allows for an automated assessment of a system component with certain measurement error.

Once this manual assessment is done, we can apply the assessment algorithm to the system component, measuring its accuracy as $F1_{component} \pm \varepsilon$). We usually just denote it as F1 of a component or an overall system.

TABLE 3

Accuracies of each component as well as overal recommendation relevance assessment (percentage)

| Source name | Correct dialogue turn for recommend-ation | Correctness of entity extraction from dialogue | Extracted product entity is properly matched in recommend-ation | Acceptable argumentation by the recommend-ation | Proper recommend-ation discourse | Overall meaning-ful recommend-ation |
|---|---|---|---|---|---|---|
| Finance | 91.3 | 94.5 | 91.2 | 73.2 | 79.4 | 72.9 |
| Auto repair | 88.4 | 96.0 | 92.6 | 78.1 | 84.2 | 74.3 |

TABLE 3-continued

Accuracies of each component as well as overal recommendation relevance assessment (percentage)

| Source name | Correct dialogue turn for recommendation | Correctness of entity extraction from dialogue | Extracted product entity is properly matched in recommendation | Acceptable argumentation by the recommendation | Proper recommendation discourse | Overall meaningful recommendation |
|---|---|---|---|---|---|---|
| Sports shopping | 89.6 | 92.9 | 90.4 | 76.0 | 82.3 | 71.4 |
| Home products shopping | 90.3 | 92.1 | 94.7 | 78.3 | 80.6 | 72.7 |
| Home-related services | 89.3 | 93.7 | 91.7 | 72.7 | 76.5 | 73.3 |
| Travel | 90.8 | 92.7 | 93.6 | 73.9 | 82.4 | 75.2 |
| Daily Dialogues | 88.4 | 89.3 | 92.0 | 71.9 | 80.7 | 72.6 |
| Genuine human dialogues | 89.3 | 91.6 | 88.3 | 67.3 | 74.2 | 68.2 |
| Dialogues constructed from blogs, forums and other sources | 90.4 | 92.7 | 90.7 | 70.8 | 73.7 | 71.4 |
| Dialogues generated from text using doc2dialogue tool | 87.2 | 90.5 | 88.3 | 74.2 | 72.8 | 73.0 |

Table 3 shows the results of evaluation of the RJC pipeline. The RJC components correspond to the table columns from left to right. We start with assessment of the best utterance to join the dialogue, proceed to product entity extraction from this utterance to its matching with available product along with the winning attribute (the one which is going to persuade the customer that the product being recommended would solve his problem). We then assess argument extraction and reasoning related to this argument before the overall recommendation results.

We do not estimate recommendation recall since we assume there is an unlimited spectrum of products and services to recommend. If no utterance yields a recommendation, we exclude the conversation from our evaluation. Once a product entity is correctly extracted from a user dialogue, there should be respective product on the web or in the available index that solves the customer problem. We show the precision for each processing step as a percentage of the correct cases.

Recommendation by joining a conversation turns out to have a high overall relevance and appropriateness to needs of customers (right column in Table 3). The accuracy range of 68-74% shows that three-quarters of recommendations should not cause user irritation and instead encourage a user to buy a product that would address a problem raised in the conversation. Although we do not assess an actual conversion rate of RJC, one can see that this form of recommendation and advertisement is least intrusive and has the highest instant relevance in comparison with other conversational recommendation means. Three greyed bottom rows in Table 3 show the datasets where we access the applicability of dialogue generation in comparison with genuine dialogues.

Accuracies of each component vary from domain to domain by less than 10% due to different linguistic and logical complexity of dialogues, product searches and argumentation analysis. Bottom greyed three rows show that genuine human dialogues are a bit more complex than the artificial ones obtained from documents (although the latter has more formal, professional language). The conclusion here is that dialogue generation by a doc2dialogue tool is an acceptable way to train and evaluate conversational systems. Three greyed bottom rows in Table 3 show the datasets where we access the applicability of dialogue generation in comparison with genuine dialogues.

Exemplary Computing Systems

Figure 25:
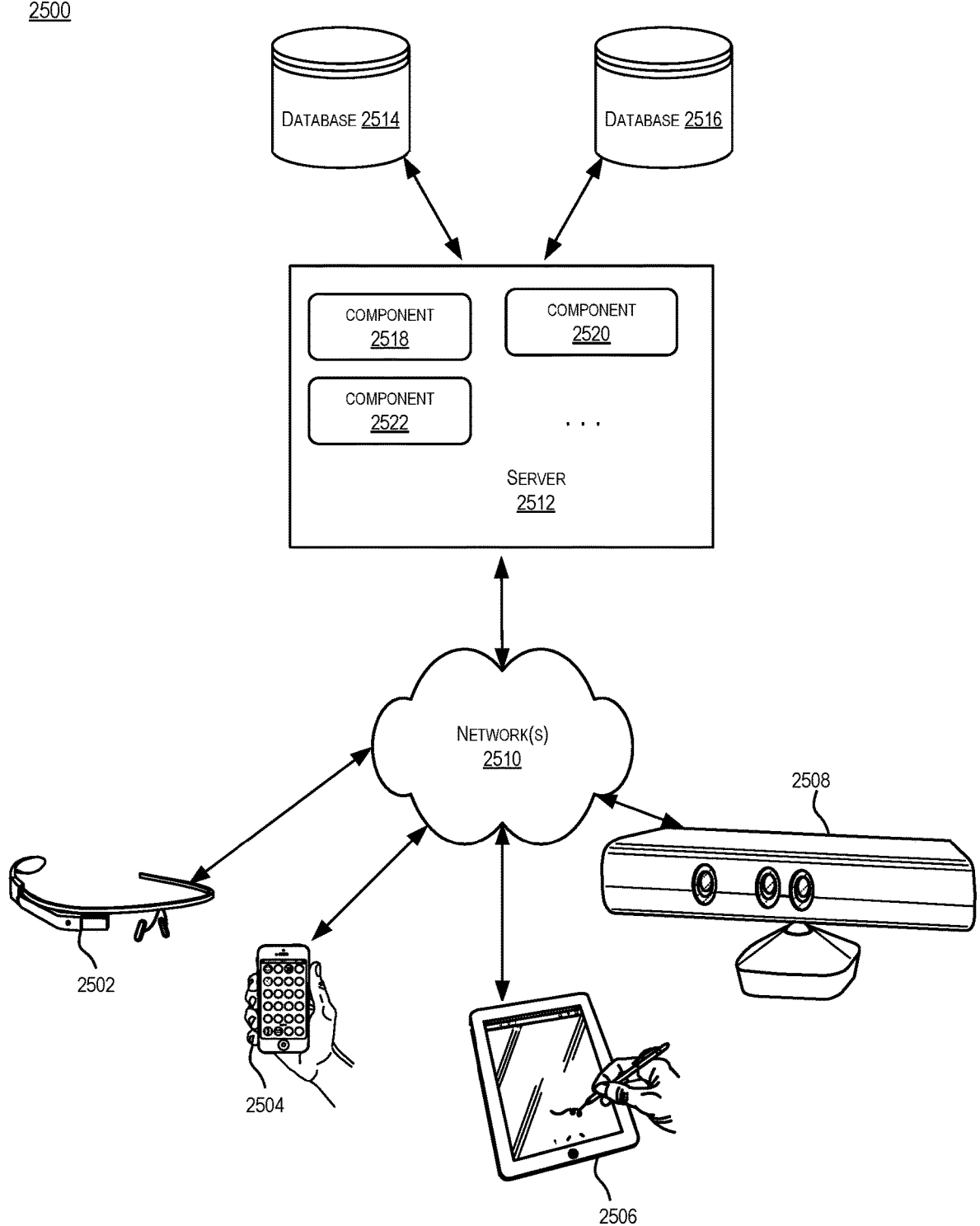
FIG. 25 depicts a simplified diagram of a distributed system for implementing one of the aspects.

FIG. 25 depicts a simplified diagram of a distributed system 2500 for implementing one of the aspects. In the illustrated aspect, distributed system 2500 includes one or more client computing devices 2502, 2504, 2506, and 2508, which are configured to execute and operate a client application such as a web browser, proprietary client (e.g., Oracle Forms), or the like over one or more network(s) 2510. Server 2512 may be communicatively coupled with remote client computing devices 2502, 2504, 2506, and 2508 via network 2510.

In various aspects, server 2512 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2502, 2504, 2506, and/or 2508. Users operating client computing devices 2502, 2504, 2506, and/or 2508 may in turn utilize one or more client applications to interact with server 2512 to utilize the services provided by these components.

In the configuration depicted in the figure, the software components 2518, 2520 and 2522 of system 2500 are shown as being implemented on server 812. In other aspects, one or more of the components of system 2500 and/or the services provided by these components may also be implemented by one or more of the client computing devices 2502, 2504, 2506, and/or 2508. Users operating the client computing devices may then utilize one or more client applications to use the services provided by these components. These components may be implemented in hardware, firmware, software, or combinations thereof. It should be appreciated that various different system configurations are possible, which may be different from distributed system 2500. The aspect shown in the figure is thus one example of a distributed system for implementing an aspect system and is not intended to be limiting.

Client computing devices 2502, 2504, 2506, and/or 2508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including, without limitation, the variety of GNU/Linux operating systems, such as for example, Google Chrome OS. Alternatively, or in addition, client computing devices 2502, 2504, 2506, and 2508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2510.

Although exemplary distributed system 2500 is shown with four client computing devices, any number of client computing devices may be supported. Other devices, such as devices with sensors, etc., may interact with server 2512.

Network(s) 2510 in distributed system 2500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2510 can be a local area network (LAN), such as one based on Ethernet, Token-Ring and/or the like. Network(s) 2510 can be a wide-area network and the Internet. It can include a virtual network, including, without limitation, a virtual private network (VPN), an intranet, an extranet, a public switched telephone network (PSTN), an infra-red network, a wireless network (e.g., a network operating under any of the Institute of Electrical and Electronics (IEEE) 802.25 suite of protocols, Bluetooth®, and/or any other wireless protocol); and/or any combination of these and/or other networks.

Server 2512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2512 can include one or more virtual machines running virtual operating systems, or other computing architectures involving virtualization. One or more flexible pools of logical storage devices can be virtualized to maintain virtual storage devices for the server. Virtual networks can be controlled by server 2512 using software defined networking. In various aspects, server 2512 may be adapted to run one or more services or software applications described in the foregoing disclosure. For example, server 2512 may correspond to a server for performing processing described above according to an aspect of the present disclosure.

Server 2512 may run an operating system including any of those discussed above, as well as any commercially available server operating system. Server 2512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 2512 may include one or more applications to analyze and consolidate data feeds and/or event updates received from users of client computing devices 2502, 2504, 2506, and 2508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 2512 may also include one or more applications to display the data feeds and/or real-time events via one or more display devices of client computing devices 2502, 2504, 2506, and 2508.

Distributed system 2500 may also include one or more databases 2514 and 2516. Databases 2514 and 2516 may reside in a variety of locations. By way of example, one or more of databases 2514 and 2516 may reside on a non-transitory storage medium local to (and/or resident in) server 2512. Alternatively, databases 2514 and 2516 may be remote from server 2512 and in communication with server 2512 via a network-based or dedicated connection. In one set of aspects, databases 2514 and 2516 may reside in a storage-area network (SAN). Similarly, any necessary files for performing the functions attributed to server 2512 may be stored locally on server 2512 and/or remotely, as appropriate. In one set of aspects, databases 2514 and 2516 may include relational databases, such as databases provided by Oracle, that are adapted to store, update, and retrieve data in response to SQL-formatted commands.

Figure 26:
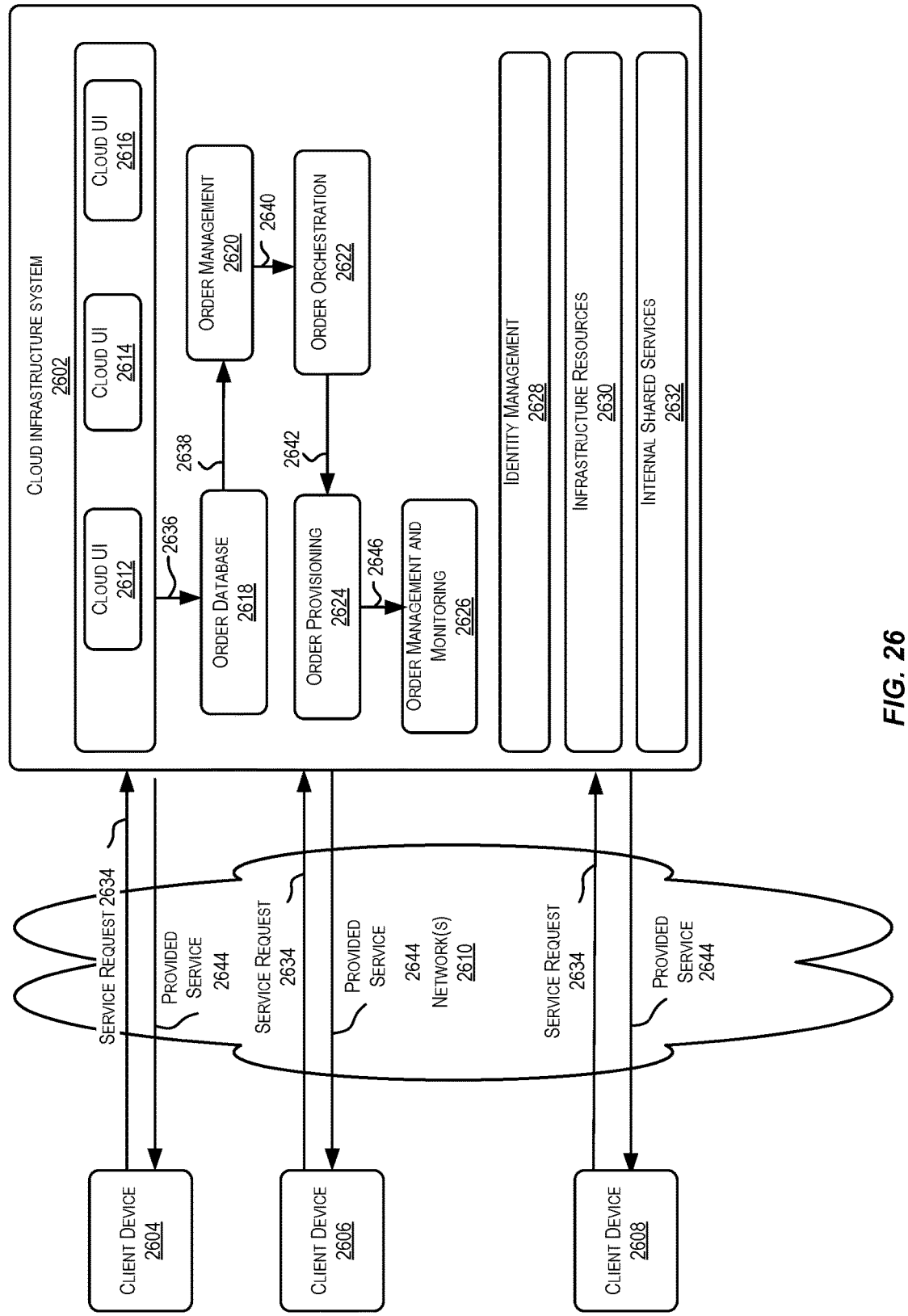
FIG. 26 is a simplified block diagram of components of a system environment by which services provided by the components of an aspect system may be offered as cloud services in accordance with an aspect.

FIG. 26 is a simplified block diagram of one or more components of a system environment 2600 by which services provided by one or more components of an aspect system may be offered as cloud services, in accordance with an aspect of the present disclosure. In the illustrated aspect, system environment 2600 includes one or more client computing devices 2604, 2606, and 2608 that may be used by users to interact with a cloud infrastructure system 2602 that provides cloud services. The client computing devices may be configured to operate a client application such as a web browser, a proprietary client application (e.g., Oracle Forms), or some other application, which may be used by a user of the client computing device to interact with cloud infrastructure system 2602 to use services provided by cloud infrastructure system 2602.

It should be appreciated that cloud infrastructure system 2602 depicted in the figure may have other components than those depicted. Further, the aspect shown in the figure is only one example of a cloud infrastructure system that may incorporate an aspect of the invention. In some other aspects, cloud infrastructure system 2602 may have more or fewer components than shown in the figure, may combine two or more components, or may have a different configuration or arrangement of components.

Client computing devices 2604, 2606, and 2608 may be devices similar to those described above for client computing devices 2502, 2504, 2506, and 2508.

Although exemplary system environment 2600 is shown with three client computing devices, any number of client computing devices may be supported. Other devices such as devices with sensors, etc. may interact with cloud infrastructure system 2602.

Network(s) 2610 may facilitate communications and exchange of data between clients computing devices 2604, 2606, and 2608 and cloud infrastructure system 2602. Each network may be any type of network familiar to those skilled in the art that can support data communications using any of a variety of commercially-available protocols, including those described above for network(s) 2510.

Cloud infrastructure system 2602 may comprise one or more computers and/or servers that may include those described above for server 2512.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2602 may be adapted to automatically provision, manage and track a customer's subscription to services offered by cloud infrastructure system 2602. Cloud infrastructure system 2602 may provide the cloud services via different deployment models. For example, services may be provided under a public cloud model in which cloud infrastructure system 2602 is owned by an organization selling cloud services (e.g., owned by Oracle) and the services are made available to the general public or different industry enterprises. As another example, services may be provided under a private cloud model in which cloud infrastructure system 2602 is operated solely for a single organization and may provide services for one or more entities within the organization. The cloud services may also be provided under a community cloud model in which cloud infrastructure system 2602 and the services provided by cloud infrastructure system 2602 are shared by several organizations in a related community. The cloud services may also be provided under a hybrid cloud model, which is a combination of two or more different models.

In some aspects, the services provided by cloud infrastructure system 2602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2602. Cloud infrastructure system 2602 then performs processing to provide the services in the customer's subscription order.

In some aspects, the services provided by cloud infrastructure system 2602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2602 may also include infrastructure resources 2630 for providing the resources used to provide various services to customers of the cloud infrastructure system. In one aspect, infrastructure resources 2630 may include pre-integrated and optimized combinations of hardware, such as servers, storage, and networking resources to execute the services provided by the PaaS platform and the SaaS platform.

In some aspects, resources in cloud infrastructure system 2602 may be shared by multiple users and dynamically re-allocated per demand. Additionally, resources may be allocated to users in different time zones. For example, cloud infrastructure system 2602 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2632 may be provided that are shared by different components or modules of cloud infrastructure system 2602 and by the services provided by cloud infrastructure system 2602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2602 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2602, and the like.

In one aspect, as depicted in the figure, cloud management functionality may be provided by one or more modules, such as an order management module 2620, an order orchestration module 2622, an order provisioning module 2624, an order management and monitoring module 2626, and an identity management module 2628. These modules may include or be provided using one or more computers and/or servers, which may be general purpose computers, specialized server computers, server farms, server clusters, or any other appropriate arrangement and/or combination.

In exemplary operation 2634, a customer using a client device, such as client computing device 2604, 2606 or 2608, may interact with cloud infrastructure system 2602 by requesting one or more services provided by cloud infrastructure system 2602 and placing an order for a subscription for one or more services offered by cloud infrastructure system 2602. In certain aspects, the customer may access a cloud User Interface (UI), cloud UI 2612, cloud UI 2614 and/or cloud UI 2616 and place a subscription order via these UIs. The order information received by cloud infrastructure system 2602 in response to the customer placing an order may include information identifying the customer and one or more services offered by the cloud infrastructure system 2602 in which the customer intends to subscribe.

After an order has been placed by the customer, the order information is received via the cloud UIs, 2626, 2614 and/or 2616.

At operation 2636, the order is stored in order database 2618. Order database 2618 can be one of several databases operated by cloud infrastructure system 2602 and operated in conjunction with other system elements.

At operation 2638, the order information is forwarded to an order management module 2620. In some instances, order management module 2620 may be configured to perform billing and accounting functions related to the order, such as verifying the order, and upon verification, booking the order.

At operation 2640, information regarding the order is communicated to an order orchestration module 2622. Order orchestration module 2622 may utilize the order information to orchestrate the provisioning of services and resources for the order placed by the customer. In some instances, order orchestration module 2622 may orchestrate the provisioning of resources to support the subscribed services using the services of order provisioning module 2624.

In certain aspects, order orchestration module 2622 enables the management of business processes associated with each order and applies business logic to determine whether an order should proceed to provisioning. At operation 2642, upon receiving an order for a new subscription, order orchestration module 2622 sends a request to order provisioning module 2624 to allocate resources and configure those resources needed to fulfill the subscription order. Order provisioning module 2624 enables the allocation of resources for the services ordered by the customer. Order provisioning module 2624 provides a level of abstraction between the cloud services provided by cloud infrastructure system 2602 and the physical implementation layer that is used to provision the resources for providing the requested services. Order orchestration module 2622 may thus be isolated from implementation details, such as whether or not services and resources are actually provisioned on the fly or pre-provisioned and only allocated/assigned upon request.

At operation 2644, once the services and resources are provisioned, a notification of the provided service may be sent to customers on client computing devices 2604, 2606 and/or 2608 by order provisioning module 2624 of cloud infrastructure system 2602.

At operation 2646, the customer's subscription order may be managed and tracked by an order management and monitoring module 2626. In some instances, order management and monitoring module 2626 may be configured to collect usage statistics for the services in the subscription order, such as the amount of storage used, the amount data transferred, the number of users, and the amount of system up time and system down time.

In certain aspects, cloud infrastructure system 2602 may include an identity management module 2628. Identity management module 2628 may be configured to provide identity services, such as access management and authorization services in cloud infrastructure system 2602. In some aspects, identity management module 2628 may control information about customers who wish to utilize the services provided by cloud infrastructure system 2602. Such information can include information that authenticates the identities of such customers and information that describes which actions those customers are authorized to perform relative to various system resources (e.g., files, directories, applications, communication ports, memory segments, etc.). Identity management module 2628 may also include the management of descriptive information about each customer and about how and by whom that descriptive information can be accessed and modified.

Figure 27:
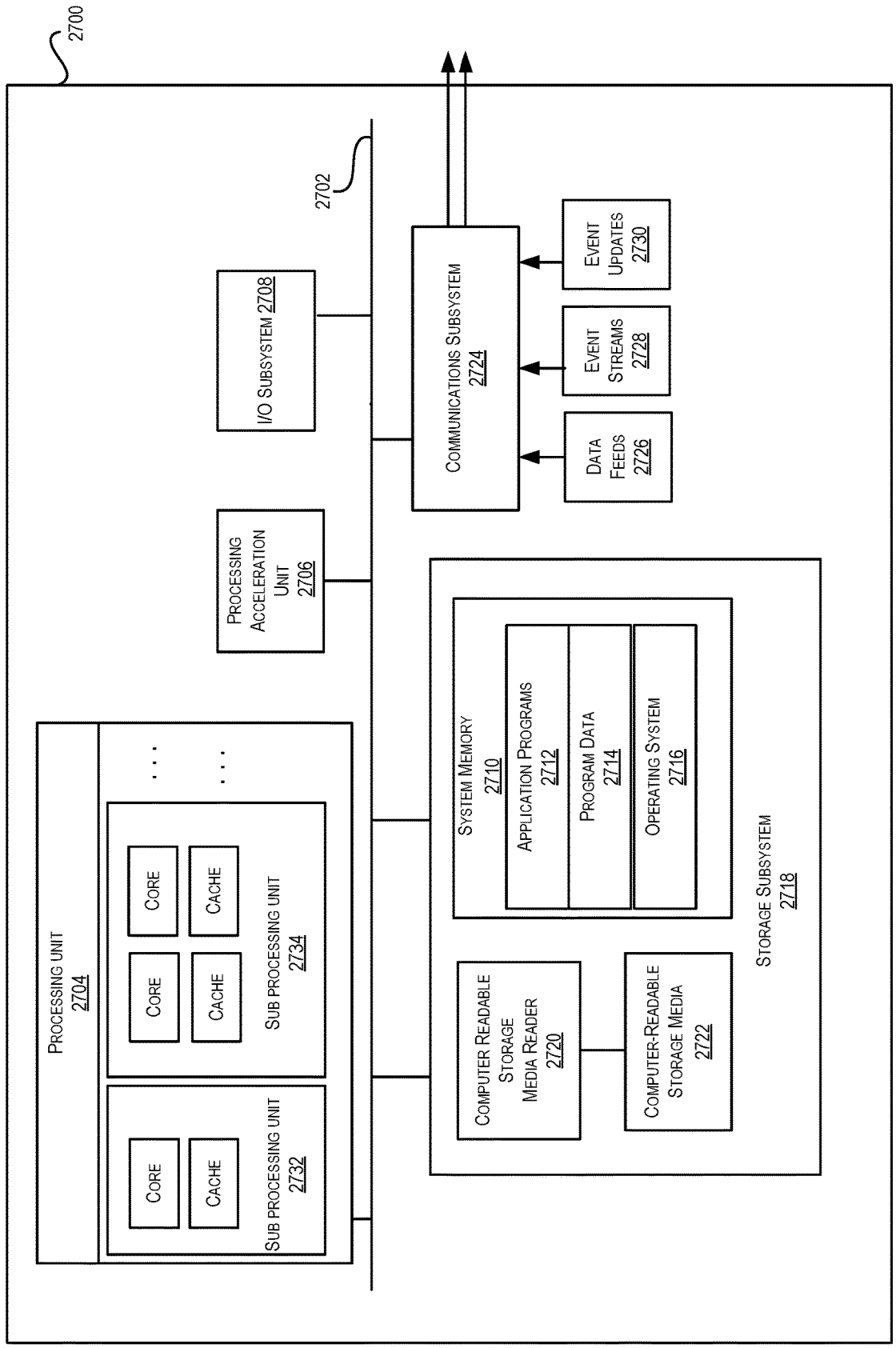
FIG. 27 illustrates an exemplary computing subsystem, in which various aspects of the present invention may be implemented.

FIG. 27 illustrates an exemplary computing subsystem 2700, in which various aspects of the present invention may be implemented. The computing subsystem 2700 may be used to implement any of the computing subsystems described above. As shown in the figure, computing subsystem 2700 includes a processing unit 2704 that communicates with a number of peripheral subsystems via a bus subsystem 2702. These peripheral subsystems may include a processing acceleration unit 2706, an I/O subsystem 2708, a storage subsystem 2718 and a communications subsystem 2724. Storage subsystem 2718 includes tangible computer-readable storage media 2722 and a system memory 2710.

Bus subsystem 2702 provides a mechanism for letting the various components and subsystems of computing subsystem 2700 communicate with each other as intended. Although bus subsystem 2702 is shown schematically as a single bus, alternative aspects of the bus subsystem may utilize multiple buses. Bus subsystem 2702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2786.1 standard.

Processing unit 2704, which can be implemented as one or more integrated circuits (e.g., a conventional microprocessor or microcontroller), controls the operation of computing subsystem 2700. One or more processors may be included in processing unit 2704. These processors may include single-core or multicore processors. In certain aspects, processing unit 2704 may be implemented as one or more independent processing units 2732 and/or 2734 with single or multicore processors included in each processing unit. In other aspects, processing unit 2704 may also be implemented as a quad-core processing unit formed by integrating two dual-core processors into a single chip.

In various aspects, processing unit 2704 can execute a variety of programs in response to program code and can maintain multiple concurrently executing programs or processes. At any given time, some or all of the program code to be executed can be resident in processor(s) 2704 and/or in storage subsystem 2718. Through suitable programming, processor(s) 2704 can provide various functionalities described above. Computing subsystem 2700 may additionally include a processing acceleration unit 2706, which can include a digital signal processor (DSP), a special-purpose processor, and/or the like.

I/O subsystem 2708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing subsystem 2700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computing subsystem 2700 may comprise a storage subsystem 2718 that comprises software elements, shown as being currently located within a system memory 2710. System memory 2710 may store program instructions that are loadable and executable on processing unit 2704, as well as data generated during the execution of these programs.

Depending on the configuration and type of computing subsystem 2700, system memory 2710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2704. In some implementations, system memory 2710 may include multiple different types of memory, such as static random access memory (SRAM) or dynamic random access memory (DRAM). In some implementations, a basic input/output system (BIOS), containing the basic routines that help to transfer information between elements within computing subsystem 2700, such as during start-up, may typically be stored in the ROM. By way of example, and not limitation, system memory 2710 also illustrates application programs 2712, which may include client applications, Web browsers, mid-tier applications, relational database management systems (RDBMS), etc., program data 2714, and an operating system 2716. By way of example, operating system 2716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2718 may also provide a tangible computer-readable storage medium for storing the basic programming and data constructs that provide the functionality of some aspects. Software (programs, code modules, instructions) that when executed by a processor, provides the functionality described above and may be stored in storage subsystem 2718. These software modules or instructions may be executed by processing unit 2704. Storage subsystem 2718 may also provide a repository for storing data used in accordance with the present invention.

Storage subsystem 2718 may also include a computer-readable storage media reader 2720 that can further be connected to computer-readable storage media 2722. Together and, optionally, in combination with system memory 2710, computer-readable storage media 2722 may comprehensively represent remote, local, fixed, and/or removable storage devices plus storage media for temporarily and/or more permanently containing, storing, transmitting, and retrieving computer-readable information.

Computer-readable storage media 2722 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2700.

By way of example, computer-readable storage media 2722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2722 may include, but is not limited to, Zip® drives, flash memory cards, universal serial bus (USB) flash drives, secure digital (SD) cards, DVD disks, digital video tape, and the like. Computer-readable storage media 2722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computing subsystem 2700.

Communications subsystem 2724 provides an interface to other computing subsystems and networks. Communications subsystem 2724 serves as an interface for receiving data from and transmitting data to other systems from computing subsystem 2700. For example, communications subsystem 2724 may enable computing subsystem 2700 to connect to one or more devices via the Internet. In some aspects, communications subsystem 2724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.25 family standards, or other mobile communication technologies, or any combination thereof), global positioning system (GPS) receiver components, and/or other components. In some aspects, communications subsystem 2724 can provide wired network connectivity (e.g., Ethernet) in addition to or instead of a wireless interface.

In some aspects, communications subsystem 2724 may also receive input communication in the form of structured and/or unstructured data feeds 2726, event streams 2728, event updates 2730, and the like on behalf of one or more users who may use computing subsystem 2700.

By way of example, communications subsystem 2724 may be configured to receive unstructured data feeds 2726 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2724 may also be configured to receive data in the form of continuous data streams, which may include event streams 2728 of real-time events and/or event updates 2730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2724 may also be configured to output the structured and/or unstructured data feeds 2726, event streams 2728, event updates 2730, and the like to one or more databases that may be in communication with one or more streaming data source computers coupled to computing subsystem 2700.

Computing subsystem 2700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computing subsystem 2700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for providing a recommendation in conversational form, the method comprising:
    determining a first sentiment score for a first utterance;
    determining a second sentiment score for a second utterance, wherein the first sentiment score and the second sentiment score individually indicate an emotion indicated by a respective utterance, and wherein determining the first sentiment score and the second sentiment score comprises:
        creating a communicative discourse tree from text comprising an utterance, wherein the communicative discourse tree comprises a discourse tree with elementary discourse units that are annotated with verb signatures;
        providing the communicative discourse tree to a machine-learning model, the machine-learning model being trained to identify emotions based on input communicative discourse trees for which emotion associations are known; and
        receiving a sentiment score from the machine-learning model;
    identifying that a difference between the first sentiment score and the second sentiment score is greater than a threshold;
    extracting a noun phrase from the second utterance;
    identifying, in an entity database, a text fragment that comprises an entity that corresponds to the noun phrase;
    verifying that the text fragment addresses a claim of the second utterance;
    forming a third utterance that comprises the text fragment; and
    outputting the third utterance to a user device.

2. The method of claim 1, wherein verifying that the text fragment addresses the claim of the second utterance comprises:
    generating a first discourse tree from the text fragment and a second discourse tree from the second utterance, wherein each of the text fragment and the second utterance comprise respective elementary discourse units;
    translating the first discourse tree into a first reason-conclusion logical formula and the second discourse tree into a second reason-conclusion logical formula; and
    identifying that the first reason-conclusion logical formula supports the second reason-conclusion logical formula.

3. The method of claim 2, wherein the translating the first discourse tree comprises:
    identifying logical atoms that correspond to text of an elementary discourse unit of the first discourse tree;
    identifying a rhetorical relation that (i) corresponds to a nucleus elementary discourse unit and a satellite elementary discourse unit and (ii) is included in a subset of rhetorical relations in the first discourse tree;
    constructing, from the rhetorical relation, a reason-conclusion logical formula by mapping the nucleus elementary discourse unit to a reason and the satellite elementary discourse unit to a conclusion;
    substituting logical atoms associated with the nucleus elementary discourse unit to the reason; and
    substituting logical atoms associated with the satellite elementary discourse unit to the conclusion.

4. The method of claim 1, wherein verifying that the text fragment addresses the claim of the second utterance comprises:
    generating a first communicative discourse tree from the text fragment and a second communicative discourse tree from the second utterance, wherein each of the text fragment and the second utterance comprise respective elementary discourse units, wherein generating the first communicative discourse tree comprises:

generating a discourse tree that represents rhetorical relationships between elementary discourse units; and matching each elementary discourse unit that has a verb to a verb signature;

translating the first communicative discourse tree into a first reason-conclusion logical formula and the second communicative discourse tree into a second reason-conclusion logical formula; and identifying that the first reason-conclusion logical formula supports the second reason-conclusion logical formula.

5. The method of claim 4, wherein the matching comprises:

accessing a plurality of verb signatures, wherein each verb signature comprises the verb of an elementary discourse unit and a sequence of thematic roles, wherein thematic roles describe a relationship between the verb and related words;

determining, for each verb signature of the plurality of verb signatures, a plurality of thematic roles of the respective signature that match a role of a word in the elementary discourse unit;

selecting a particular verb signature from the plurality of verb signatures based on the particular verb signature comprising a highest number of matches; and associating the particular verb signature with the elementary discourse unit.

6. The method of claim 1, further comprising constructing the entity database by:

determining, from a training text corpus, a particular entity corresponding to the noun phrase;

obtaining a result by verifying the noun phrase against a database; and adding the result to the entity database.

7. The method of claim 6, wherein adding the result to the database includes traversing an ontology of the database to add the result to a location corresponding to the noun phrase.

8. A non-transitory computer-readable storage medium storing computer-executable program instructions, wherein when executed by a processing device, the program instructions cause the processing device to perform operations comprising:

determining a first sentiment score for a first utterance;

determining a second sentiment score for a second utterance, wherein the first sentiment score and the second sentiment score individually indicate an emotion indicated by a respective utterance, and wherein determining the first sentiment score and the second sentiment score comprises:

creating a communicative discourse tree from text comprising an utterance, wherein the communicative discourse tree comprises a discourse tree with elementary discourse units that are annotated with verb signatures;

providing the communicative discourse tree to a machine-learning model, the machine-learning model being trained to identify emotions based on input communicative discourse trees for which emotion associations are known; and receiving a sentiment score from the machine-learning model;

identifying that a difference between the first sentiment score and the second sentiment score is greater than a threshold;

extracting a noun phrase from the second utterance;

identifying, in an entity database, a text fragment that comprises an entity that corresponds to the noun phrase;

verifying that the text fragment addresses a claim of the second utterance;

forming a third utterance that comprises the text fragment; and outputting the third utterance to a user device.

9. The non-transitory computer-readable storage medium of claim 8, wherein verifying that the text fragment addresses the claim of the second utterance comprises:

generating a first discourse tree from the text fragment and a second discourse tree from the second utterance, wherein each of the text fragment and the second utterance comprise respective elementary discourse units;

translating the first discourse tree into a first reason-conclusion logical formula and the second discourse tree into a second reason-conclusion logical formula; and identifying that the first reason-conclusion logical formula supports the second reason-conclusion logical formula.

10. The non-transitory computer-readable storage medium of claim 9, wherein the translating the first discourse tree comprises:

identifying logical atoms that correspond to text of an elementary discourse unit of the first discourse tree;

identifying a rhetorical relation that (i) corresponds to a nucleus elementary discourse unit and a satellite elementary discourse unit and (ii) is included in a subset of rhetorical relations in the first discourse tree;

constructing, from the rhetorical relation, a reason-conclusion logical formula by mapping the nucleus elementary discourse unit to a reason and the satellite elementary discourse unit to a conclusion;

substituting logical atoms associated with the nucleus elementary discourse unit to the reason; and substituting logical atoms associated with the satellite elementary discourse unit to the conclusion.

11. The non-transitory computer-readable storage medium of claim 8, wherein verifying that the text fragment addresses the claim of the second utterance comprises:

generating a first communicative discourse tree from the text fragment and a second communicative discourse tree from the second utterance, wherein each of the text fragment and the second utterance comprise respective elementary discourse units, wherein generating the first communicative discourse tree comprises:

generating a discourse tree that represents rhetorical relationships between elementary discourse units; and matching each elementary discourse unit of the discourse tree that has a verb to a verb signature;

translating the first communicative discourse tree into a first reason-conclusion logical formula and the second communicative discourse tree into a second reason-conclusion logical formula; and identifying that the first reason-conclusion logical formula supports the second reason-conclusion logical formula.

12. The non-transitory computer-readable storage medium of claim 11, wherein the matching comprises:
  accessing a plurality of verb signatures, wherein each verb signature comprises the verb of an elementary discourse unit and a sequence of thematic roles, wherein thematic roles describe a relationship between the verb and related words;
  determining, for each verb signature of the plurality of verb signatures, a plurality of thematic roles of the respective signature that match a role of a word in the elementary discourse unit;
  selecting a particular verb signature from the plurality of verb signatures based on the particular verb signature comprising a highest number of matches; and
  associating the particular verb signature with the elementary discourse unit.

13. The non-transitory computer-readable storage medium of claim 8, further comprising constructing the entity database by:
  determining, from a training text corpus, a particular entity corresponding to the noun phrase;
  obtaining a result by verifying the noun phrase against a database; and
  adding the result to the entity database.

14. The non-transitory computer-readable storage medium of claim 13, wherein adding the result to the database includes traversing an ontology of the database to add the result to a location corresponding to the noun phrase.

15. A system comprising:
  a non-transitory computer-readable medium storing computer-executable program instructions; and
  a processing device communicatively coupled to the non-transitory computer-readable medium for executing the computer-executable program instructions, wherein executing the computer-executable program instructions configures the processing device to perform operations comprising:
    determining a first sentiment score for a first utterance;
    determining a second sentiment score for a second utterance, wherein the first sentiment score and the second sentiment score individually indicate an emotion indicated by a respective utterance, and wherein determining the first sentiment score and the second sentiment score comprises:
      creating a communicative discourse tree from text comprising an utterance, wherein the communicative discourse tree comprises a discourse tree with elementary discourse units that are annotated with verb signatures;
      providing the communicative discourse tree to a machine-learning model, the machine-learning model being trained to identify emotions based on input communicative discourse trees for which emotion associations are known; and
      receiving a sentiment score from the machine-learning model;
    identifying that a difference between the first sentiment score and the second sentiment score is greater than a threshold;
    extracting a noun phrase from the second utterance;
    identifying, in an entity database, a text fragment that comprises an entity that corresponds to the noun phrase;
    verifying that the text fragment addresses a claim of the second utterance;
    forming a third utterance that comprises the text fragment; and
    outputting the third utterance to a user device.

16. The system of claim 15, wherein verifying that the text fragment addresses the claim of the second utterance comprises:
  generating a first communicative discourse tree from the text fragment and a second communicative discourse tree corresponding to the second utterance;
  translating the first communicative discourse tree into a first reason-conclusion logical formula and the communicative discourse tree corresponding to the second utterance into a second reason-conclusion logical formula; and
  identifying that the first reason-conclusion logical formula supports the second reason-conclusion logical formula.

17. The system of claim 16, wherein the translating comprises:
  identifying logical atoms that correspond to text of an elementary discourse unit;
  identifying a rhetorical relation that (i) corresponds to a nucleus elementary discourse unit and a satellite elementary discourse unit and (ii) is included in a subset of rhetorical relations in the respective communicative discourse tree;
  constructing, from the rhetorical relation, a reason-conclusion logical formula by mapping the nucleus elementary discourse unit to a reason and the satellite elementary discourse unit to a conclusion;
  substituting logical atoms associated with the nucleus elementary discourse unit to the reason; and
  substituting logical atoms associated with the satellite elementary discourse unit to the conclusion.

18. The system of claim 15, wherein generating the communicative discourse tree comprises:
  generating a discourse tree that represents rhetorical relationships between elementary discourse units;
  accessing a plurality of verb signatures, wherein each verb signature comprises a verb of the elementary discourse unit and a sequence of thematic roles, wherein thematic roles describe a relationship between the verb and related words;
  determining, for each verb signature of the plurality of verb signatures, a plurality of thematic roles of the respective signature that match a role of a word in the elementary discourse unit;
  selecting a particular verb signature from the plurality of verb signatures based on the particular verb signature comprising a highest number of matches; and
  associating the particular verb signature with the elementary discourse unit.

19. The system of claim 15, wherein executing the computer-executable program instructions configures the processing device to perform additional operations comprising constructing the entity database by:
  determining, from a training text corpus, a particular entity corresponding to the noun phrase, wherein the entity comprises attributes;
  forming a search query comprising the entity and the attributes;
  submitting the search query to a search engine;
  obtaining a result from the search engine; and
  adding the result into the entity database.

20. The system of claim 19, wherein adding the result to the entity database includes traversing an ontology of the entity database to add the result to a location corresponding to the noun phrase.

* * * * *